US012456444B2

(12) United States Patent
Sato et al.

(10) Patent No.: US 12,456,444 B2
(45) Date of Patent: Oct. 28, 2025

(54) KEYBOARD DEVICE AND COOLING METHOD OF DRIVE DEVICE

(71) Applicant: Roland Corporation, Shizuoka (JP)

(72) Inventors: Hitoshi Sato, Shizuoka (JP); Yutaka Goto, Shizuoka (JP); Kousuke Ishikawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 244 days.

(21) Appl. No.: 18/489,858

(22) Filed: Oct. 19, 2023

(65) Prior Publication Data

US 2024/0169964 A1 May 23, 2024

(30) Foreign Application Priority Data

Nov. 21, 2022 (JP) ................................. 2022-185679

(51) Int. Cl.
*G10H 1/34* (2006.01)

(52) U.S. Cl.
CPC .................................. *G10H 1/346* (2013.01)

(58) Field of Classification Search
CPC ...................................................... G10H 1/346
See application file for complete search history.

(56) References Cited

U.S. PATENT DOCUMENTS

2024/0169964 A1* 5/2024 Sato ....................... G10H 1/346

FOREIGN PATENT DOCUMENTS

| | | |
|---|---|---|
| JP | H0415692 | 1/1992 |
| JP | H05-015093 | 2/1993 |
| JP | H05-030892 | 4/1993 |
| JP | H06222752 | 8/1994 |
| JP | H09269773 | 10/1997 |
| JP | 2000338964 | 12/2000 |
| JP | 2001184054 | 7/2001 |

* cited by examiner

*Primary Examiner* — Robert W Horn
(74) *Attorney, Agent, or Firm* — JCIPRNET

(57) ABSTRACT

A keyboard device includes keys, drive devices, a housing, and a fan. The keys are arranged side by side in a scale direction. The drive devices apply, to the keys, a driving force swinging the key. The housing includes a shelf plate supporting the drive devices. The fan is attached to an upper side of the shelf plate of the housing and exhausts air in the housing to outside. The shelf plate includes an air intake port for sucking in air outside the housing by the fan.

20 Claims, 10 Drawing Sheets

FIG. 7A

| | Lp1 | Lp2 | Lp3 | Lp4 | Lp5 | Lp6 | Lp7 | Lp8 | Lp9 | Lp10 | … |
|---|---|---|---|---|---|---|---|---|---|---|---|
| Pitch (mm) of key of bass unit | 13.4 | 26.9 | 41.1 | 55.1 | 69.2 | 83.3 | 97.3 | 111.5 | 125 | 138.4 | … |

FIG. 7B

| | Hp1 | Hp2 | Hp3 | Hp4 | Hp5 | Hp6 | Hp7 | Hp8 | Hp9 | Hp10 | … |
|---|---|---|---|---|---|---|---|---|---|---|---|
| Pitch (mm) of key of treble unit | 13.5 | 26.9 | 40.3 | 53.7 | 67.1 | 80.6 | 94.8 | 108.8 | 122.9 | 137 | … |

FIG. 7C

| | Av1 | Av2 | Av3 | Av4 | Av5 | Av6 | Av7 | Av8 | Av9 | Av10 | … |
|---|---|---|---|---|---|---|---|---|---|---|---|
| Average value (mm) of pitch of key | 13.45 | 26.9 | 40.7 | 54.4 | 68.15 | 81.95 | 96.05 | 110.15 | 123.95 | 137.7 | … |

FIG. 7D

| | Sp1 | Sp2 | Sp3 | Sp4 | Sp5 | Sp6 | Sp7 | Sp8 | Sp9 | Sp10 | … |
|---|---|---|---|---|---|---|---|---|---|---|---|
| Pitch (mm) of solenoid | 13.4 | 26.9 | 40.7 | 54.4 | 68.1 | 81.9 | 96 | 110.1 | 124 | 137.7 | … |

FIG. 7E

| | Lg1 | Lg2 | Lg3 | Lg4 | Lg5 | Lg6 | Lg7 | Lg8 | Lg9 | Lg10 | |
|---|---|---|---|---|---|---|---|---|---|---|---|
| Spx−Lpx (mm) | 0 | 0 | −0.4 | −0.7 | −1.1 | −1.4 | −1.3 | −1.4 | −1 | −0.7 | … |
| Spx−Lpx+0.7 (mm) | 0.7 | 0.7 | 0.3 | 0 | −0.4 | −0.7 | −0.6 | −0.7 | −0.3 | 0 | … |

FIG. 7F

| | Hg1 | Hg2 | Hg3 | Hg4 | Hg5 | Hg6 | Hg7 | Hg8 | Hg9 | Hg10 | |
|---|---|---|---|---|---|---|---|---|---|---|---|
| Spx−Hpx (mm) | −0.1 | 0 | 0.4 | 0.7 | 1 | 1.3 | 1.2 | 1.3 | 1.1 | 0.7 | … |
| Spx−Hpx−0.6 (mm) | −0.7 | −0.6 | −0.2 | 0.1 | 0.4 | 0.7 | 0.6 | 0.7 | 0.5 | 0.1 | … |

KEYBOARD DEVICE AND COOLING METHOD OF DRIVE DEVICE

CROSS-REFERENCE TO RELATED APPLICATION

This application claims the priority benefit of Japan application serial no. 2022-185679, filed on Nov. 21, 2022. The entirety of the above-mentioned patent application is hereby incorporated by reference herein and made a part of this specification.

BACKGROUND

Technical Field

The disclosure relates to a keyboard device and a cooling method of a drive device, and more particularly, to a keyboard device and a cooling method of a drive device capable of cooling down a drive device of a key efficiently.

Related Art

A technique has been disclosed to cool down a drive device by a fan in a keyboard device including a function of automatic performance that swings a key by a driving force of the drive device. For example, Patent Document 1 (Japanese Utility Model Publication No. H05-015093; e.g., paragraphs 0010, 0011 and FIG. 1 of Patent Document 1) describes a technique of attaching a fan 4 to a shelf plate 5 that supports a key drive mechanism 3 (drive device). According to this technique, air sucked from above keys 1 and 2 by the fan 4 is exhausted to below the shelf plate 5, so air warmed by the heat of the key drive mechanism 3 in the housing can be exhausted to outside while cooling down the key drive mechanism 3 by this airflow.

However, the air on the upper side of the keys may become hot due to lighting or sunlight. Thus, in a configuration in which air is sucked from the upper side of the keys as in the related art described above, it is likely that the drive device cannot be cooled down efficiently.

SUMMARY

A keyboard device according to an embodiment of the disclosure includes a plurality of keys, a plurality of drive devices, a housing, and a fan. The plurality of keys are arranged side by side in a scale direction. The plurality of drive devices apply, to the plurality of keys, a driving force swinging the key. The housing includes a shelf plate supporting the plurality of drive devices. The fan is attached to an upper side of the shelf plate of the housing and exhausts air in the housing to outside. The shelf plate includes an air intake port for sucking in air outside the housing by the fan.

A cooling method of a drive device according to an embodiment of the disclosure is a cooling method of a drive device in a keyboard device including: a plurality of keys arranged side by side in a scale direction; a plurality of drive devices that apply, to the plurality of keys, a driving force swinging the key; a housing that includes a shelf plate supporting the plurality of drive devices; and a fan that is attached to an upper side of the shelf plate of the housing and exhausts air in the housing to outside. The cooling method includes forming, at the shelf plate, an air intake port for sucking in air outside the housing, and cooling down the drive device with the air sucked from the air intake port by the fan.

BRIEF DESCRIPTION OF DRAWINGS

FIG. 7A is a table showing a pitch of a key of the bass unit. FIG. 7B is a table showing a pitch of a key of the treble unit. FIG. 7C is a table showing an average value of the pitches of the keys of the bass unit and the treble unit. FIG. 7D is a table showing a pitch of the solenoid.

FIG. 7E is a table showing an error in the arrangement of the solenoid with respect to the key of the bass unit. FIG. 7F is a table showing an error in the arrangement of the solenoid respect to the key of the treble unit.

DESCRIPTION OF EMBODIMENTS

Embodiments of the disclosure provide a keyboard device and a cooling method of a drive device capable of cooling down a drive device of a key efficiently.

Figure 1:
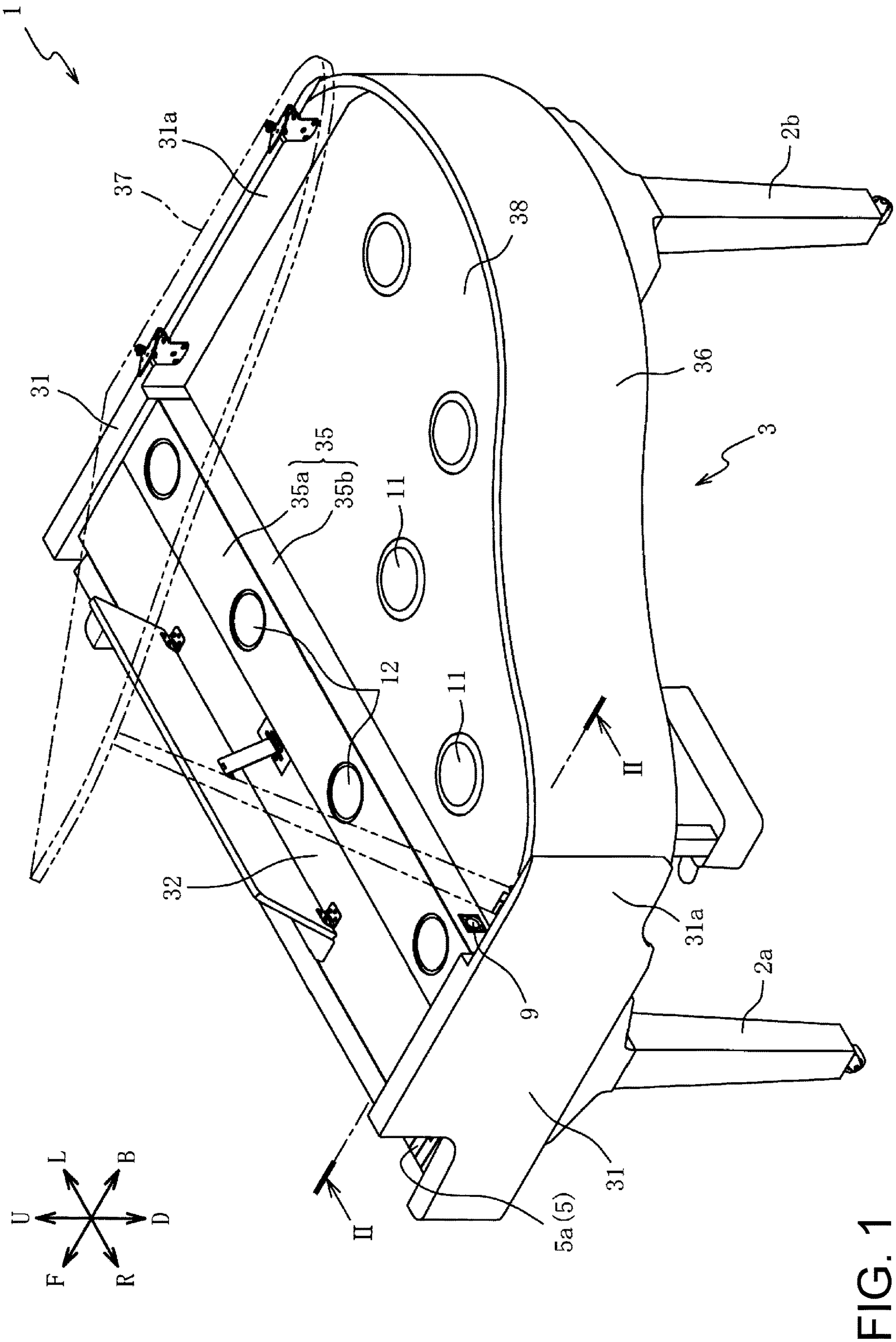
FIG. 1 is a rear perspective view of a keyboard device according to a first embodiment.
Figure 2:
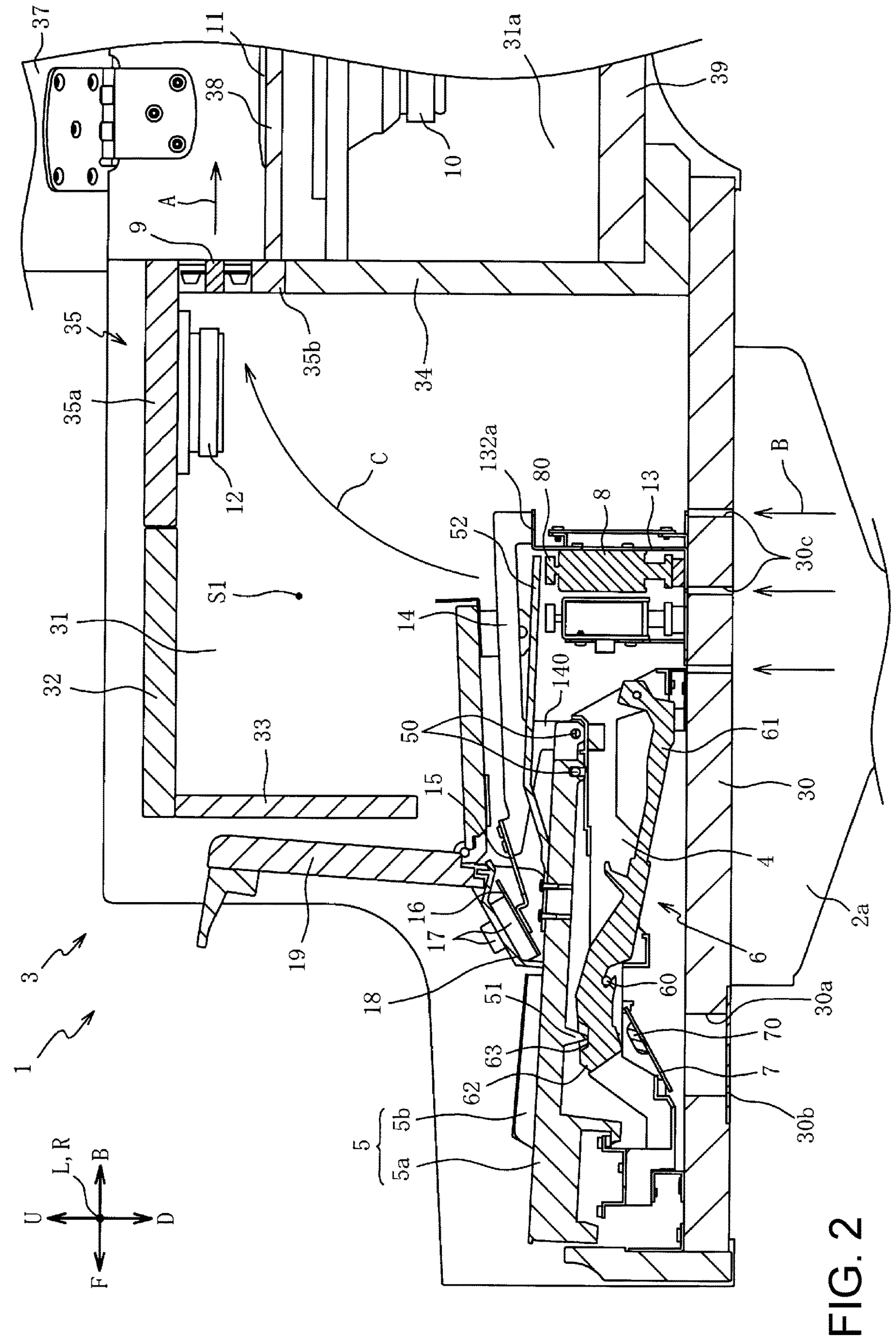
FIG. 2 is a partially enlarged cross-sectional view of the keyboard device taken along line II-II in FIG. 1.

Hereinafter, exemplary embodiments will be described with reference to the attached drawings. First, referring to FIG. 1 and FIG. 2, an overall configuration of a keyboard device 1 according to a first embodiment will be described. FIG. 1 is a rear perspective view of the keyboard device 1 according to the first embodiment, and FIG. 2 is a partially enlarged cross-sectional view of the keyboard device 1 taken along line II-II in FIG. 1. An U-D direction, a F-B direction, and an L-R direction of arrows in FIG. 1 and FIG. 2 respectively indicate an up-down direction, a front-rear direction, and a scale direction (a direction in which a plurality of keys 5 are arranged side by side) of the keyboard device 1, and the same also applies to FIG. 3A and onward.

As shown in FIG. 1 and FIG. 2, the keyboard device 1 is a keyboard musical instrument (electronic piano) modeled after an acoustic grand piano. The keyboard device 1 includes a housing 3 supported by a plurality (three in this embodiment) of legs 2*a* and 2*b* extending in the up-down direction.

Among the legs 2*a* and 2*b*, the leg 2*a* supports a front end side (an end on the arrow F side) of the housing 3, and the leg 2*b* supports a rear end side (an end on the arrow B side). Although not shown in the figures, two ends in the scale direction of the housing 3 are supported by a pair of legs 2*a*.

A shelf plate 30 (see FIG. 2) of the housing 3 is fixed to upper ends of the legs 2*a*, and the shelf plate 30 is formed in a flat plate shape extending in the scale direction (arrow L-R direction). A plurality of keys 5 are supported on an upper surface of the shelf plate 30 via a chassis 4 made of resin. The keys 5 are composed of a plurality (52 in this embodiment) of white keys 5*a* for playing fundamental tones and a plurality (36 in this embodiment) of black keys 5*b* for playing derivative tones, and the plurality of white keys 5*a* and black keys 5*b* are arranged side by side in the scale direction.

A rotation shaft 50 of the key 5 is provided on an upper surface of a rear end side (arrow B side) of the chassis 4, and with the rotation shaft 50, a rear end portion of each key 5 is rotatably (swingably) supported by the chassis 4. A hammer 6 that operates in conjunction with the rotation of the key 5 is provided below the key 5.

Hereinafter, a detailed configuration of the white key 5*a* will be described, and this configuration is substantially the same for the black key 5*b*. At an approximately central portion of the chassis 4 in the front-rear direction, the hammer 6 is supported rotatably around a rotation shaft 60 that extends along the scale direction. The hammer 6 includes a mass part 61 (mass body) for providing a key-stroke feeling when pressing the white key 5*a*, and the mass part 61 is located on the rear side (arrow B side) of the rotation shaft 60.

A portion of the hammer 6 on the front side (arrow F side) of the rotation shaft 60 is configured as a pressing part 62 for pushing a switch 70 of a substrate 7 when pressing the white key 5*a*. A receiving part 63 that recesses downward is formed on an upper surface of the pressing part 62, and a protruding part 51 of the white key 5*a* is inserted into the receiving part 63.

The protruding part 51 protrudes downward from an approximately central portion in the front-rear direction of the white key 5*a*, and a bottom surface of the receiving part 63 is configured as a sliding surface on which a tip (lower end) of the protruding part 51 slides in the front-rear direction. When a performer presses the white key 5*a*, the protruding part 51 of the white key 5*a* slides along the bottom surface of the receiving part 63, and the pressing part 62 is pushed downward by the protruding part 51, so that the hammer 6 rotates around the rotation shaft 60 (counterclockwise in FIG. 1).

Since the switch 70 is provided below the pressing part 62, upon pressing of the white key 5*a*, the switch 70 is pushed by the pressing part 62. Keystroke information (note information) of the white key 5*a* is detected according to ON/OFF of the switch 70, and a musical tone signal based on this detection result is outputted to outside.

On the other hand, in this embodiment, a function is also provided to perform automatic performance by applying a driving force from a solenoid 8 to the white key 5*a* instead of rotating the white key 5*a* by a performer's operation. A known configuration may be adopted as the configuration of the solenoid 8 (configuration for driving a plunger 80, control method for driving according to a performance sound, etc.), so detailed descriptions thereof will be omitted, and a known configuration is illustrated in Japanese Patent Application Laid-Open No. 2001-184054.

An arm 52 in a rod shape is fixed to an upper surface of a rear end side (arrow B side) of the white key 5*a*, and the arm 52 extends more rearward than the white key 5*a*. The solenoid 8 is arranged below a rear end portion of the arm 52, and upon extension of the plunger 80 of the solenoid 8, the arm 52 is pushed upward. With the arm 52 pushed up, the white key 5*a* rotates around the rotation shaft 50. Accordingly, automatic performance of the white key 5*a* can be performed.

Upon repetition of such automatic performance or keystroke by a performer, the switch 70 tends to wear out. Thus, in this embodiment, a through hole 30*a* for facilitating replacement of the substrate 7 is formed at the shelf plate 30. The through hole 30*a* is an elongated hole extending in the scale direction, and a lower end of the through hole 30*a* is blocked by a lid 30*b*.

The through hole 30*a* is formed at a position facing the substrate 7 in the up-down direction, and the lid 30*b* is detachably attached (e.g., screwed) to a lower surface of the shelf plate 30. Thus, by removing the lid 30*b* from the shelf plate 30, it is possible to perform work of attaching and detaching the substrate 7 to and from the chassis 4 through the through hole 30*a*, which facilitates maintenance and replacement of the substrate 7 (switch 70).

Further, when automatic performance of the key 5 is performed, air in a space (hereinafter referred to as an "accommodating space S1") in the housing 3 that accommodates the solenoid 8 is warmed by the heat generated by the solenoid 8. Thus, in this embodiment, a fan 9 for exhausting the air in the accommodating space S1 is attached to the housing 3. Hereinafter, an attachment structure of the fan 9 will be described, and of the housing 3, a plate that closes off a lateral side of the accommodating space S1 will be described as a lateral plate 31, a plate that closes off an upper side will be described as a top plate 32, a plate that closes off a front side will be described as a front plate 33, and a plate that closes off a rear side will be described as a rear plate 34.

A pair of lateral plates 31 rise upward from two ends of the shelf plate 30 in the scale direction (arrow L-R direction), and the top plate 32 is fixed to upper end sides of the pair of lateral plates 31. The top plate 32 is a part where a music stand (see FIG. 1) is fixed, but in FIG. 2, illustration of the music stand is omitted to simplify the figure. The front plate 33 extends downward from a front end of the top plate 32, and the rear plate 34 rises upward from a rear end part of the shelf plate 30 which extends more rearward than the top plate 32.

An upper end of the rear plate 34 is located lower than the top plate 32, and an opening portion of the accommodating space S1 formed by the top plate 32 and the rear plate 34 is blocked by a blocking plate 35 having an L-shaped cross-section. Including the blocking plate 35, each of the shelf plate 30, the top plate 32, the front plate 33, and the rear plate 34 which surround the accommodating space S1 connects the pair of lateral plates 31 facing each other in the scale direction.

Of the blocking plate 35, a part that closes off the upper side of the accommodating space S1 together with the top plate 32 will be described as a top plate part 35*a*, and a part that closes off the rear side of the accommodating space S1 together with the rear plate 34 will be described as a rear plate part 35*b*.

The fan 9 is fixed to the rear plate part 35*b*, and the fan 9 is a blower that generates an airflow (see arrow A) exhausting air in the accommodating space S1 to outside the housing 3. Since an air intake port 30*c* that connects the accommodating space S1 to outside (penetrating the shelf plate 30 in the up-down direction) is formed at the shelf plate 30, as the air in the accommodating space S1 is exhausted by the fan 9, relatively cold air below the shelf plate 30 is sucked into the accommodating space S1 through the air intake port 30*c* (see arrow B). Since the air intake port 30*c* is formed in the vicinity of the solenoid 8, the solenoid 8 can be cooled down efficiently by the relatively cold air sucked from the air intake port 30*c*.

Further, since the fan 9 is arranged higher than the air intake port 30*c*, the air in the accommodating space S1 warmed by the solenoid 8 is efficiently exhausted to outside the housing 3 by an airflow generated by exhaustion of the fan 9 as well as a rising airflow due to natural convection (see arrow C). Thus, since it is possible to suppress accumulation of heat in the accommodating space S1, the solenoid 8 can be cooled down efficiently.

Further, since the fan 9 is attached to the rear plate part 35*b* of the blocking plate 35, an exhaust direction of the fan 9 can be oriented toward the rear side of the housing 3. Accordingly, it is possible to prevent warm air in the housing 3 from being blown to a performer side.

To cool down the solenoid 8 efficiently, as described above, it is preferable to form the air intake port 30*c* in the vicinity of the solenoid 8, for example. However, it is more preferable that the air intake port 30*c* is formed directly below the solenoid 8 (at a position at which the air intake port 30*c* and the solenoid 8 overlap when viewed in the up-down direction), for example. Accordingly, since it becomes easy for the air sucked from the air intake port 30*c* to hit the solenoid 8, the solenoid 8 can be cooled down efficiently.

Further, in the case where the air intake port 30*c* is formed in a region that is not directly below the solenoid 8, the air intake port 30*c* may be formed in a region on an opposite side of the fan 9 with the solenoid 8 positioned in between. In other words, for example, as in this embodiment, in the case where the fan 9 is formed on the rear side of the solenoid 8, the air intake port 30*c* may be formed on the front side of the solenoid 8. With such a configuration, since it is possible to arrange the solenoid 8 on the path of the airflow directed from the air intake port 30*c* to the fan 9, it becomes easy for the air sucked from the air intake port 30*c* to hit the solenoid 8. Thus, the solenoid 8 can be cooled down efficiently.

The pair of lateral plates 31 (see FIG. 1) facing each other in the scale direction include protruding parts 31*a* that protrude more rearward than the rear plate 34 (rear plate part 35*b*), and the pair of protruding parts 31*a* are connected by a back surface plate 36 (see FIG. 1). The back surface plate 36 is formed in a curved shape that bulges toward the rear side and is modeled after a grand piano.

Of the pair of protruding parts 31*a*, a large roof 37 is pivotally supported by a hinge to the protruding part 31*a* located on a bass side (arrow L side) in the scale direction (hereinafter, a bass side and a treble side in the scale direction will be simply referred to as a "bass side" and a "treble side").

A soundboard 38 is provided below the large roof 37, and the soundboard 38 is fixed to an inner peripheral side of the protruding parts 31*a* and the back surface plate 36. The soundboard 38 is arranged at a position lower than upper ends of the protruding parts 31*a*, the rear plate part 35*b*, and the back surface plate 36, and the rear plate part 35*b* at which the fan 9 is attached is formed in a wall shape rising from a front end of the soundboard 38. Thus, the exhaust from the fan 9 is discharged toward a space between the large roof 37 and the soundboard 38.

For this reason, for example, if the fan 9 is arranged at the bass side of the rear plate part 35*b*, warm air exhausted from the fan 9 is likely to accumulate between the large roof 37 and the soundboard 38. This is because a region at a base end side of the large roof 37 (in the vicinity of a position at which the large roof 37 is pivotally supported) has a relatively narrow up-down spacing with respect to the soundboard 38 and ventilation is difficult.

In contrast, in this embodiment, since the fan 9 is arranged at an end on the treble side of the rear plate part 35*b*, that is, on the treble side of a center of the rear plate part 35*b* in the scale direction, air can be exhausted from the fan 9 toward a region where the large roof 37 opens widely. Accordingly, it is possible to prevent warm air exhausted from the fan 9 from accumulating between the large roof 37 and the soundboard 38.

Further, since the lateral side and the rear side of the rear plate part 35*b* are surrounded by the protruding parts 31*a* and the back surface plate 36, it is difficult to see the fan 9 attached to the rear plate part 35*b* from outside. Thus, the appearance of the keyboard device 1 can be improved.

A lower plate 39 (see FIG. 2) is arranged below the soundboard 38. The lower plate 39 closes off from below a space surrounded by the rear plate 34, the protruding parts 31*a*, the back surface plate 36 (see FIG. 1), and the soundboard 38, and a plurality (four in this embodiment) of speakers 10 are attached in this space. A sound emission direction of the speakers 10 is directed upward (soundboard 38 side). A sound emission hole (not shown) is formed at the soundboard 38 at a position facing the speaker 10 in the up-down direction, and the sound emission hole is covered with a net 11 (speaker grill).

In other words, including the rear plate 34, a part of each plate (protruding parts 31*a* of lateral plates 31, back surface plate 36, and soundboard 38) located on the rear side of the rear plate 34 also functions as a speaker box. Further, a plurality of speakers 12 arranged side by side in the scale direction are also attached to the top plate part 35*a* of the blocking plate 35, and a sound emission direction of the speakers 12 is also directed upward.

Herein, for example, even if a configuration is adopted in which the fan 9 is attached to the soundboard 38 and a ventilation port connecting the fan 9 and the accommodating space S1 is formed at the rear plate 34 (or the rear plate 34 is omitted), the air in the accommodating space S1 can be exhausted to outside the housing 3. Further, even with a configuration in which the fan 9 is attached to the top plate part 35*a*, the air in the accommodating space S1 can be exhausted to outside the housing 3. However, in the case of these configurations, there is a possibility that vibration or sound of the fan 9 may affect vibration or sound of the speakers 10 and 12.

In contrast, in this embodiment, since the fan 9 is attached to the rear plate part 35*b* of the blocking plate 35, compared to the case where the fan 9 is attached to each plate (e.g., soundboard 38) located on the rear side of the rear plate 34 or to the top plate part 35*a* as described above, it is possible to suppress the influence of vibration of the fan 9 on vibration of the speakers 10 and 12.

Figure 3A:
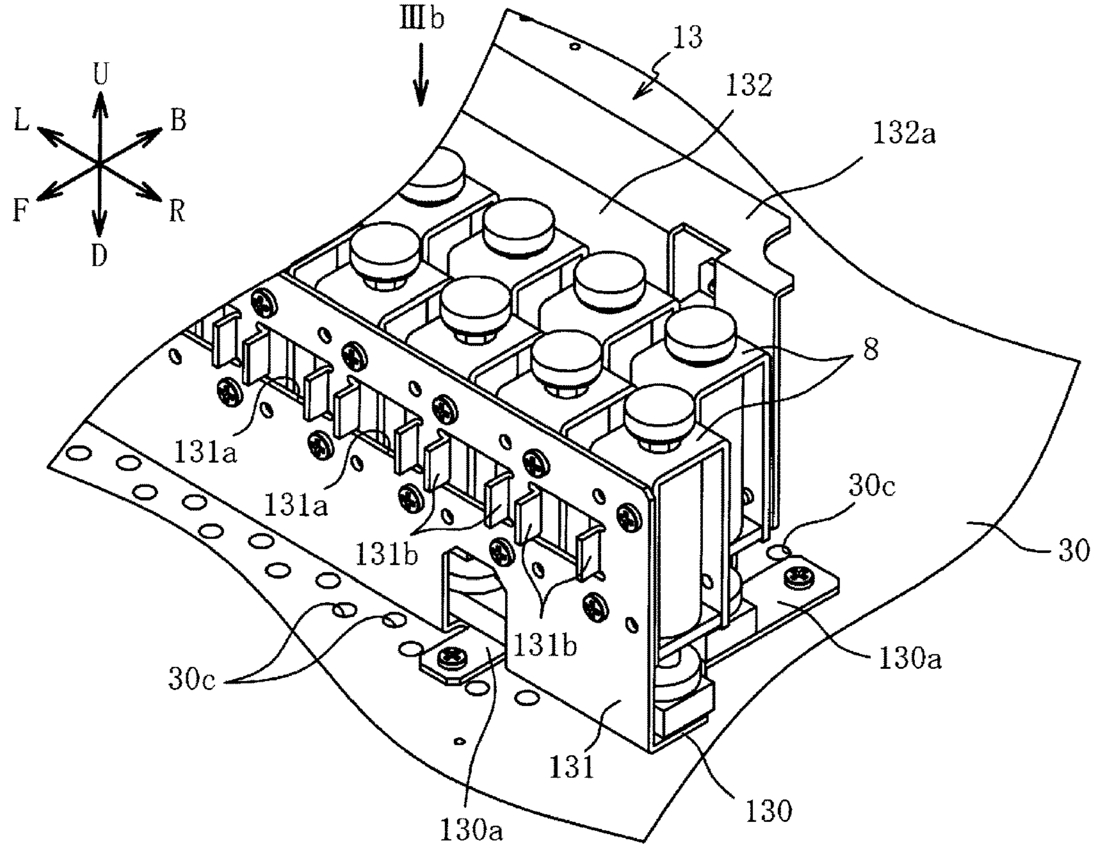
FIG. 3A is a front perspective view of a solenoid and a chassis.
Figure 3B:
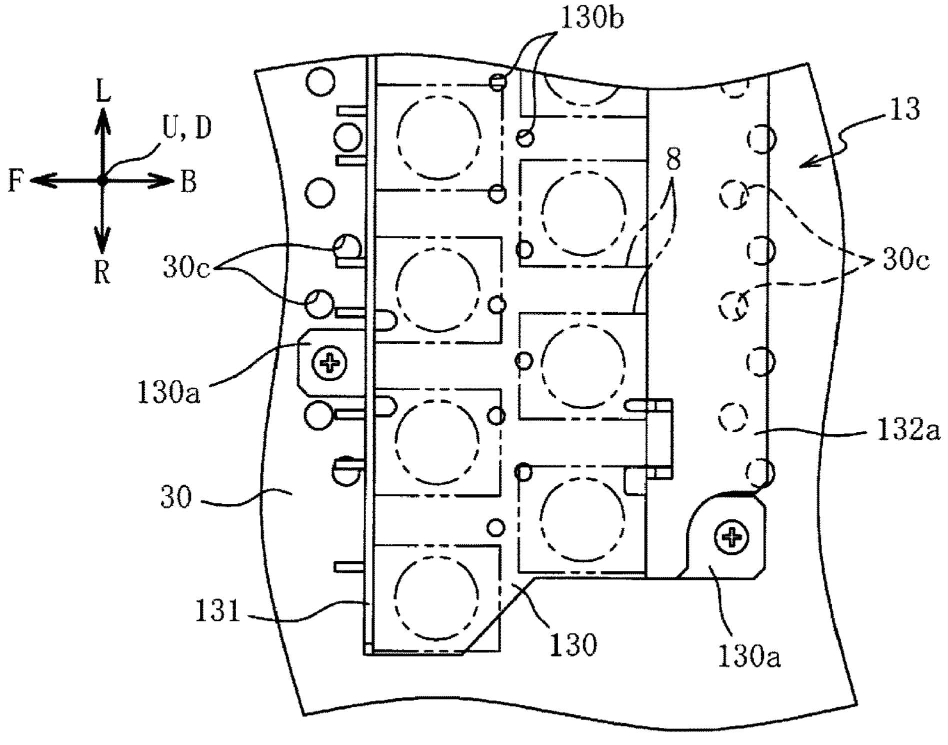
FIG. 3B is a top view of the solenoid and the chassis viewed in the direction of an arrow IIIb in FIG. 3A.

Next, referring to FIG. 2, FIG. 3A, and FIG. 3B, the configuration of the keyboard device 1 will be further described. FIG. 3A is a front perspective view of the solenoid 8 and a solenoid chassis 13, and FIG. 3B is a top view of the solenoid 8 and the solenoid chassis 13 viewed in an arrow IIIb direction in FIG. 3A. In FIG. 3B, to facilitate understanding, the outer shape of the solenoid 8 is schematically illustrated in a double-dot dashed line.

As shown in FIG. 2, FIG. 3A, and FIG. 3B, the solenoids 8 are arranged side by side in a staggered pattern in the scale direction (arrow L-R direction), and the plurality of solenoids 8 are fixed to the shelf plate 30 via the solenoid chassis 13.

The solenoid chassis 13 includes a bottom surface part 130 (see FIG. 3A and FIG. 3B) that is fixed to the shelf plate 30, and a front surface part 131 and a rear surface part 132 that rise from front and rear ends of the bottom surface part 130, and these parts 130 to 132 are integrally formed by bending a metal plate.

Protruding pieces 130*a* protrude to front and rear sides from the bottom surface part 130, and the protruding pieces 130*a* are screwed to the shelf plate 30. Among the solenoids 8 arranged side by side in a staggered pattern, each solenoid 8 in a front row (arranged side by side in the scale direction on the arrow F side) is screwed to the front surface part 131, and each solenoid 8 in a rear row (arranged side by side in the scale direction on the arrow B side) is screwed to the rear surface part 132.

A plurality of openings 130*b* (see FIG. 3B) arranged side by side in a staggered pattern in the scale direction are formed at the bottom surface part 130, and the openings 130*b* are formed at positions connected to the air intake ports 30*c* (see FIG. 2) of the shelf plate 30. The plurality of air intake ports 30*c* formed at the shelf plate 30 are also arranged side by side in a staggered pattern in the scale direction (see FIG. 3B).

Among the plurality of openings 130*b*, since a part of the openings 130*b* are formed at positions overlapping with the solenoids 8 in the up-down direction (directly below the solenoids 8), it becomes easy for the air sucked from the air intake ports 30*c* to hit the solenoids 8 through the openings 130*b*. Thus, the solenoids 8 can be cooled down efficiently.

Since the solenoids 8 are fixed to the front surface part 131 and the rear surface part 132 of the solenoid chassis 13, the heat of the solenoids 8 is transferred to the front surface part 131 and the rear surface part 132. Since the front surface part 131 and the rear surface part 132 are metal plates rising from the shelf plate 30, the heat of the front surface part 131 and the rear surface part 132 transferred from the solenoids 8 can be dissipated efficiently.

A plurality of openings 131*a* arranged side by side in the scale direction are formed at the front surface part 131, and the openings 131*a* are formed at positions facing the solenoids 8 in the front-rear direction (arrow F-B direction). Accordingly, the warmed air around the solenoids 8 can escape from the openings 131*a*, and with air passing through the openings 131*a*, it becomes easy to cool down the front surface part 131. Thus, the solenoids 8 can be cooled down efficiently. Although not shown in the figures, openings similar to the openings 131*a* are also provided at the rear surface part 132.

The plurality of solenoids 8 are arranged at intervals in the scale direction, and each opening 131*a* faces a gap (space) between the solenoids 8. Accordingly, since it becomes easy for the warmed air between the solenoids 8 to escape from the opening 131*a*, also for this reason, the solenoids 8 can be cooled down efficiently.

Heat dissipation plates 131*b* protrude to the front side from a front surface of the front surface part 131, and the plurality of heat dissipation plates 131*b* are arranged side by side in the scale direction. Since the heat dissipation plate 131*b* functions as a heat sink, it becomes easy to cool down the front surface part 131. Further, since the heat dissipation plate 131*b* is formed at an edge of the opening 131*a*, it becomes easy to cool down the heat dissipation plate 131*b* by the air passing through the opening 131*a*. Accordingly, the solenoids 8 can be cooled down efficiently.

Further, the heat dissipation plate 131*b* is formed in a plate shape extending in the up-down direction (i.e., the heat dissipation plates 131*b* face each other in the scale direction), and the air intake port 30*c* of the shelf plate 30 is formed below each of the heat dissipation plates 131*b*. Accordingly, it is possible to suppress interference of the heat dissipation plate 131*b* with the airflow rising from the air intake port 30*c*, and it becomes easy to cool down the heat dissipation plate 131*b* by the air passing between the heat dissipation plates 131*b*. Thus, the solenoids 8 can be cooled down efficiently.

The opening 131*a* and the heat dissipation plate 131*b* are parts formed by cutting and bending (pressing) a metal plate that serves as the material of the front surface part 131. That is, although the heat dissipation plate 131*b* is integrally formed with the front surface part 131, the heat dissipation plate 131*b* may also be formed separately from the front surface part 131.

A bent part 132*a* is formed by bending the rear surface part 132 to the rear side at an upper end of the rear surface part 132, and a rear end portion of a holder 14 (see FIG. 2) is screwed to the bent part 132*a*. The holder 14 is formed using a metal plate and extends to the front side from an upper surface of the bent part 132*a*. A protruding piece 140 protruding downward is formed at an approximately central portion of the holder 14 in the front-rear direction, and although not shown in the figure, the protruding piece 140 of the holder 14 is screwed to the chassis 4.

A substrate 16 is fixed via a fixing bracket 15 to a front end of the holder 14. The substrate 16 is formed in a plate shape extending in the scale direction, and electronic components 17, such as a display device (not shown) formed of an LED or liquid crystal display and operators for adjusting volume or changing a mode, are provided on the substrate 16. The electronic components 17 and the substrate 16 are covered from above with an operation panel 18 extending in the scale direction.

In other words, the operation panel 18 is supported by a front end portion of the holder 14 via the fixing bracket 15, the substrate 16, and the electronic components 17. As described above, since the holder 14 is fixed to the bent part 132*a* of the solenoid chassis 13, it is possible to provide the solenoid chassis 13 with a function of fixing the holder 14 in addition to a function of supporting the solenoid 8.

Herein, it is also possible to fix the holder 14 not to the solenoid chassis 13 but to the shelf plate 30. In an example of such a configuration, a rear end portion of the holder 14 is extended more rearward than the solenoid chassis 13, and a leg part extending downward (to the shelf plate 30) from this extended portion is fixed to the shelf plate 30. However, in such a configuration, as the holder 14 becomes larger, it is necessary to secure a space on the rear side of the solenoid chassis 13 for arranging the holder 14 (leg part described above).

In contrast, in this embodiment, the holder 14 is fixed to the solenoid chassis 13 (bent part 132*a*). With such a configuration, compared to the case where the holder 14 extending more rearward than the solenoid chassis 13 is fixed to the shelf plate 30 as described above, the size of the holder 14 can be reduced, and the space on the rear side of the solenoid chassis 13 can be utilized efficiently.

The holder 14 extends from the solenoid chassis 13 to an upper surface side of the key 5, and an upper surface (a part on the rear side of the surface pressed by the performer) of each key 5 is covered with the operation panel 18 supported by the holder 14. A keyboard cover 19 for opening and closing the keys 5 and the operation panel 18 is provided at the housing 3. A configuration for opening and closing the keyboard cover 19 will be described with reference to FIG. 4.

Figure 4:
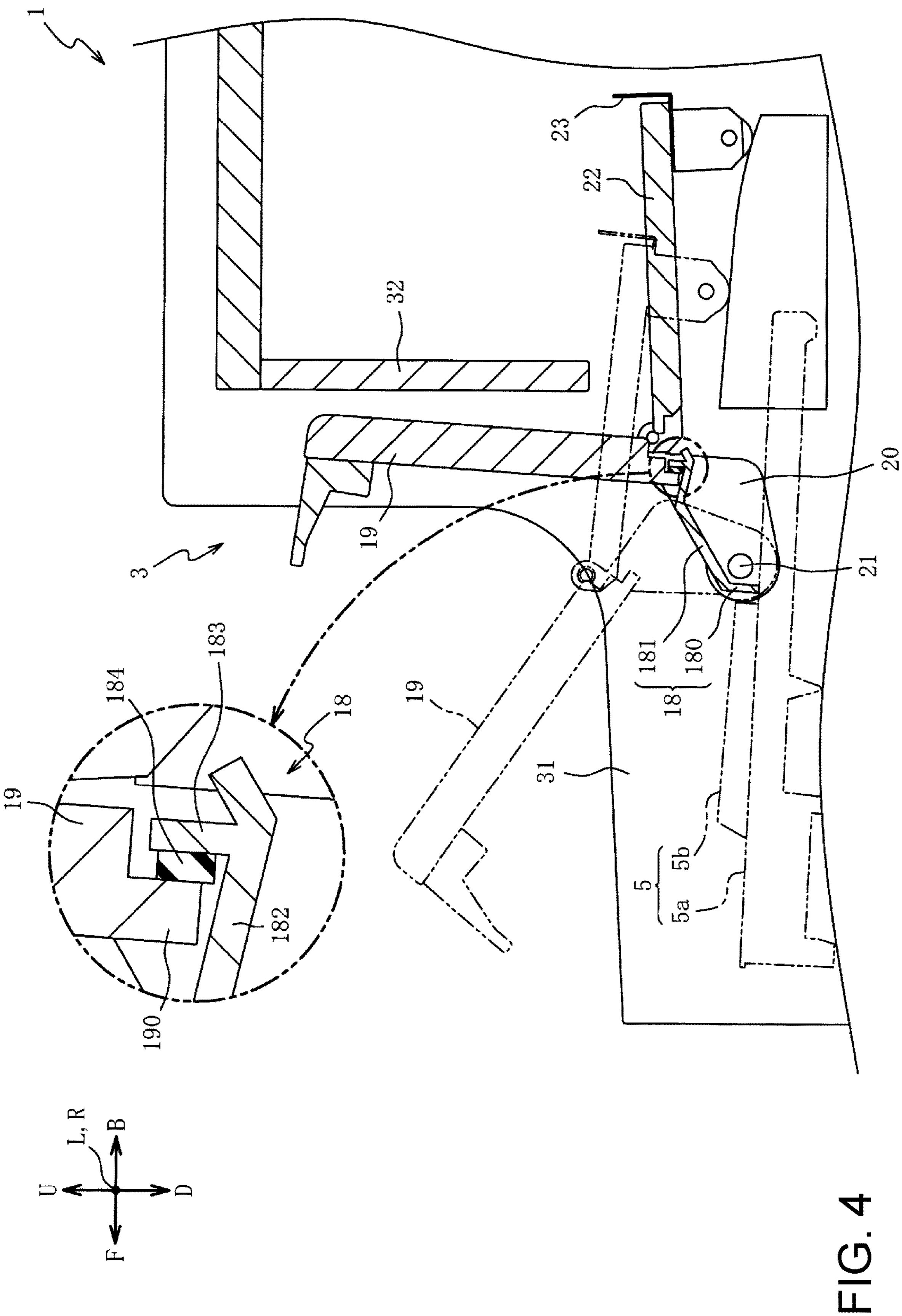
FIG. 4 is a partially enlarged cross-sectional view of the keyboard device.

FIG. 4 is a partially enlarged cross-sectional view of the keyboard device 1. In FIG. 4, only a main part of the keyboard device 1 is shown, and the keys 5 and the keyboard cover 19 being opened and closed are shown in double-dot dashed lines.

As shown in FIG. 4, the operation panel 18 is formed in a plate shape including a vertical part 180 that rises substantially vertically from an upper surface of the white key 5*a*, a first inclined part 181 that is inclined upward to the rear side from an upper end of the vertical part 180, and a second inclined part 182 that is inclined downward to the rear side from a rear end of the first inclined part 181 (see enlarged portion in FIG. 4). The first inclined part 181 is a part at which the electronic components 17 (see FIG. 2) are provided.

A bracket 20 is fixed to an end of the keyboard cover 19 in the scale direction (arrow L-R direction). The bracket 20 is supported rotatably around a rotation shaft 21 provided at the housing 3, and the keyboard cover 19 rotates around the rotation shaft 21 together with the bracket 20. With the rotation of the keyboard cover 19, the keyboard cover 19 is configured to be capable of forming a state in which the keyboard cover 19 covers the keys 5 and the operation panel 18 and a state in which the keyboard cover 19 opens the keys 5 and the operation panel 18.

The keyboard cover 19 in the opened state is located on an upper-rear side of the rotation shaft 21, and in such a state, the keyboard cover 19 is in a posture rising substantially vertically from an upper surface of the operation panel 18 (second inclined part 182).

As shown in the double-dot dashed line in FIG. 4, upon rotation of the keyboard cover 19 in the opened stated to the front side around the rotation shaft 21, a base end portion (lower end portion of the keyboard cover 19 in the opened state shown in solid lines in FIG. 4) of the keyboard cover 19 displaces away from the second inclined part 182 of the operation panel 18 to an upper-front side.

A rear cover 22 pivotally supported by the bracket 20 follows the rotation of the keyboard cover 19. A sliding structure of the rear cover 22 may have a known configuration, so detailed descriptions thereof will be omitted, and as a known configuration, a sliding structure is illustrated in Japanese Utility Model Publication No. H05-030892. A closure plate 23 protrudes upward from a rear end of the rear cover 22, and although not shown in the figure, in the closed state of the keyboard cover 19, the closure plate 23 contacts the front plate 33 of the housing 3.

Automatic performance of the keys 5 is mainly performed with the keyboard cover 19 opened. However, upon driving the fan 9 (see FIG. 2) with the keyboard cover 19 opened, air may be sucked into the housing 3 from a gap between the operation panel 18 and the keyboard cover 19. If air is sucked from this gap, air suction through the air intake ports 30*c* (see FIG. 2) of the shelf plate 30 weakens accordingly, so the solenoids 8 cannot be cooled down efficiently.

In contrast, in this embodiment, as shown in the enlarged portion of FIG. 4, a panel-side protrusion 183 rises upward from a rear end portion of the second inclined part 182 of the operation panel 18. An elastic body 184 such as rubber or felt is attached to a front surface of the panel-side protrusion 183, and the panel-side protrusion 183 and the elastic body 184 are continuously formed across two ends of the operation panel 18 in the scale direction.

On the other hand, a cover-side protrusion 190 protruding toward the operation panel 18 is formed from a base end portion (lower end in the enlarged portion of FIG. 4) of the keyboard cover 19, and the cover-side protrusion 190 is also continuously formed across two ends of the keyboard cover 19 in the scale direction.

In the opened state of the keyboard cover 19, the panel-side protrusion 183 faces a rear surface of the cover-side protrusion 190, and the elastic body 184 is in close contact with the rear surface of the cover-side protrusion 190. Accordingly, since the gap between the operation panel 18 and the keyboard cover 19 can be blocked by the elastic body 184, it is possible to suppress suction of air from this gap in the case of driving the fan 9 (see FIG. 2) in the opened state of the keyboard cover 19. Thus, since it is possible to suppress weakening of air suction through the air intake ports 30*c* (see FIG. 2) of the shelf plate 30, the solenoids 8 can be cooled down efficiently.

In this embodiment, although the elastic body 184 is attached to the panel-side protrusion 183, the elastic body 184 may also be attached to the cover-side protrusion 190. That is, it is sufficient to attach the elastic body 184 to at least one (or both) of the operation panel 18 and the keyboard cover 19.

Further, the elastic body 184 may be omitted. Even if the elastic body 184 is omitted, in the opened state of the keyboard cover 19, since the panel-side protrusion 183 faces the rear surface of the cover-side protrusion 190, it is possible to suppress suction of air from the gap between the operation panel 18 and the keyboard cover 19 compared to the case where the protrusions 183 and 190 are not present.

Further, it is also possible to omit the panel-side protrusion 183 and close off between an upper surface of the second inclined part 182 and a lower surface of the cover-side protrusion 190 with the elastic body 184, or it is also possible to omit the cover-side protrusion 190 and close off between an upper surface of the panel-side protrusion 183 and a base end surface (lower surface of the keyboard cover 19 in the enlarged portion of FIG. 4) of the keyboard cover 19 with the elastic body 184. In these configurations as well, it is sufficient to attach the elastic body 184 to either one (or both) of the operation panel 18 and the keyboard cover 19.

Further, it is also possible to omit the panel-side protrusion 183 and the elastic body 184 and form the cover-side protrusion 190 itself with an elastic body, or it is also possible to omit the cover-side protrusion 190 and the elastic body 184 and form the panel-side protrusion 183 itself with an elastic body. In the case of these configurations, it is sufficient to form the panel-side protrusion 183 or the cover-side protrusion 190 in a length sufficient to block the gap between the operation panel 18 and the keyboard cover 19.

In this manner, by providing a blocking part on at least one of the operation panel 18 and the keyboard cover 19 to block the gap between the operation panel 18 and the keyboard cover 19, it is possible to suppress weakening of air suction through the air intake ports 30*c* (refer to FIG. 2) of the shelf plate 30. Thus, the solenoids 8 can be cooled down efficiently.

In the case where air is sucked from a gap between the keyboard cover 19 in the opened state and the front plate 33 or from a gap between the front plate 33 and the rear cover 22, an elastic body that is in close contact with a rear surface of the keyboard cover 19 in the opened state may be attached to a front surface of the front plate 33. With such a configuration, it is possible to suppress suction of air from the gap between the keyboard cover 19 and the front plate 33 (or between the front plate 33 and the rear cover 22).

Figure 5:
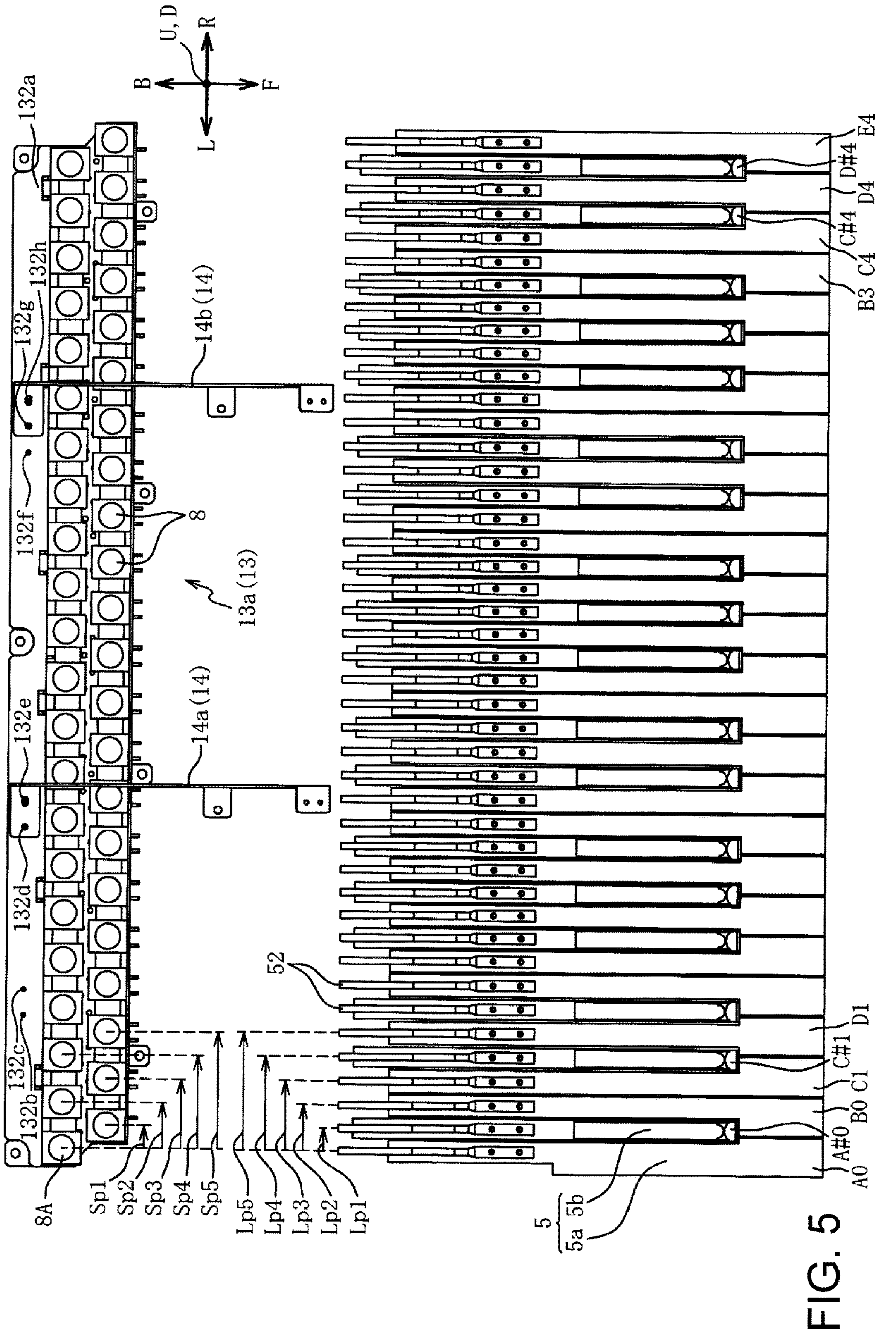
FIG. 5 is a top view of a bass unit.
Figure 6:
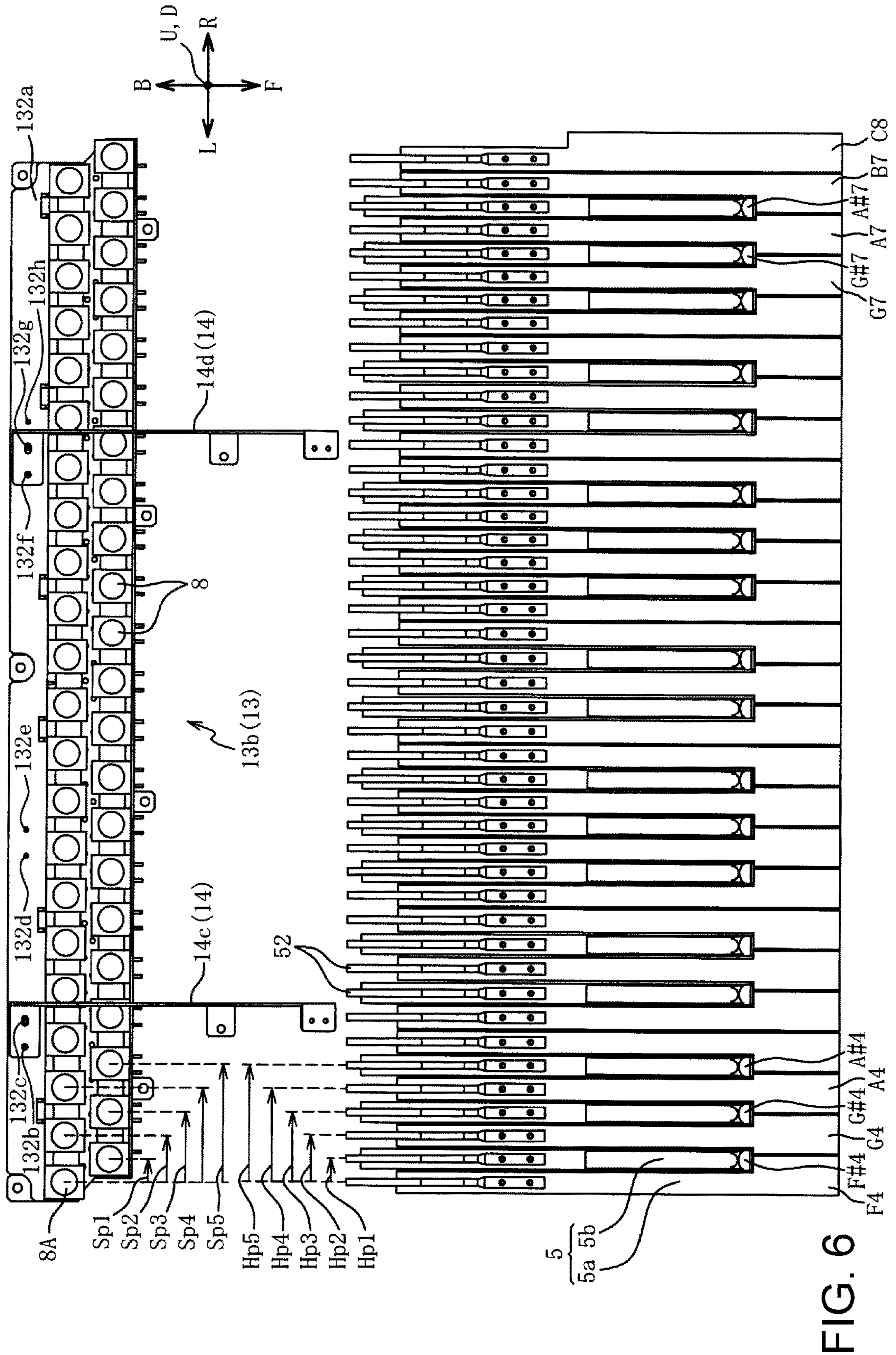
FIG. 6 is a top view of a treble unit.

Next, referring to FIG. 5 and FIG. 6, the configuration of the keyboard device 1 will be further described. In the following description, configurations around a bass-side chassis 13*a* shown in FIG. 5 (such as the solenoid 8 supported by the bass-side chassis 13*a* and the key 5 to which a driving force is applied from the solenoid 8) will be collectively described as a bass unit, and configurations around a treble-side chassis 13*b* shown in FIG. 6 will be collectively described as a treble unit.

FIG. 5 is a top view of the bass unit, and FIG. 6 is a top view of the treble unit. In FIG. 5 and FIG. 6, illustration of a part of a rear end side of the arm 52 of the key 5 is omitted, and a state in which the key 5 and the solenoid 8 are separated (spaced apart) in the front-rear direction (arrow F-B direction) is illustrated.

As shown in FIG. 5 and FIG. 6, the solenoid chassis 13 supporting the solenoid 8 is composed of a bass-side chassis 13*a* (see FIG. 5) and a treble-side chassis 13*b* (see FIG. 6). Although the chassis 13*a* and 13*b* are given different names for convenience of description, each of the chassis 13*a* and 13*b* has the same configuration.

A driving force is applied from the plurality of solenoids 8 supported by the bass-side chassis 13*a* to the keys 5 (44 keys on the bass side) with note names A0, A #0, B0, C1, C #1, D1 . . . B3, C4, C #4, D4, D #4, and E4.

A driving force is applied from the plurality of solenoids 8 supported by the treble-side chassis 13*b* to the keys 5 (44 keys on the treble side) with note names F4, F #4, G4, G #4, A4, A #4 . . . G7, G #7, A7, A #7, B7, and C8.

Among the keys 5, the keys 5 (e.g., those with note names B3 to A #4) arranged in the vicinity of the center in the scale direction are used more frequently during performance than the keys 5 (e.g., those with note names A0 to D1 or G7 to C8) arranged on the bass side or the treble side in the scale direction. Thus, when performing automatic performance using the solenoids 8, the frequency of driving the solenoids 8 (e.g., those that apply a driving force to the keys 5 with note names B3 to A #4) arranged in the vicinity of the center in the scale direction tends to be high. In other words, the solenoids 8 arranged on the treble side (arrow R side in FIG. 5) in the bass-side chassis 13*a* and the solenoids 8 arranged on the bass side (arrow L side in FIG. 6) in the treble-side chassis 13*b* tend to deteriorate relatively easily.

In contrast, in this embodiment, even if the arrangements of the bass-side chassis 13*a* and the treble-side chassis 13*b* are swapped with each other, each of these chassis 13*a* and 13*b* is capable of being fixed to the shelf plate 30 (see FIG. 2). By swapping the arrangements in this manner, since the degree of deterioration of each solenoid 8 supported by each chassis 13*a* and 13*b* easily becomes uniform, occurrence of premature malfunctioning (failure) of part of the solenoids 8 can be suppressed. Further, since the chassis 13*a* and 13*b* are common components (i.e., having the same configuration), the quantity of types of components of the keyboard device 1 can be reduced.

A plurality (four in this embodiment) of holders 14 arranged in the scale direction are fixed to the bent part 132*a* of each chassis 13*a* and 13*b*. The holders 14 are common components, but in the following description, they will be described and labeled as holders 14*a* to 14*d* in a sequence from the ones located on the bass side in the scale direction.

Screw holes 132*b* to 132*h* for fixing the holders 14*a* to 14*d* are formed at the bent part 132*a* of each chassis 13*a* and 13*b*. The screw holes 132*b* to 132*h* are arranged along the scale direction (in a sequence of screw holes 132*b* to 132*h*), and the screw hole located farthest on the bass side (arrow L side) of the bent part 132*a* is the screw hole 132*b*.

The interval between the screw holes 132*b* and 132*c*, the interval between the screw holes 132*d* and 132*e*, and the interval between the three screw holes 132*f* to 132*h* are the same. The screw holes 132*b* and 132*c* serve for fixing the holder 14*c* (see FIG. 6), and the screw holes 132*d* and 132*e* serve for fixing the holder 14*a* (see FIG. 5).

Among the three screw holes 132*f* to 132*h*, the screw holes 132*f* and 132*g* serve for fixing the holder 14*d* (see FIG. 6), and the screw holes 132*g* and 132*h* serve for fixing the holder 14*b* (see FIG. 5).

Thus, for example, in the case where the bass-side chassis 13*a* shown in FIG. 5 is fixed to an arrangement region of the keys 5 of the treble unit shown in FIG. 6, it is possible to screw the holder 14*c* to the screw holes 132*b* and 132*c* and screw the holder 14*d* to the screw holes 132*f* and 132*g*. Similarly, in the case where the treble-side chassis 13*b* shown in FIG. 6 is fixed to an arrangement region of the keys 5 of the bass unit shown in FIG. 5, the holders 14*a* and 14*b* can be fixed using the screw holes 132*d*, 132*e*, 132*g*, and 132*h*.

In other words, even if the arrangements of the bass-side chassis 13*a* and the treble-side chassis 13*b* are swapped with each other from the states shown in FIG. 5 and FIG. 6, it is possible to fix the holders 14*a* to 14*d* to each chassis 13*a* and 13*b* without changing the arrangement (fixed position with respect to the substrate 16 shown in FIG. 2) of each holder 14*a* to 14*d* in the scale direction or changing the holders 14*a* to 14*d* to different components. Accordingly, since the chassis 13*a* and 13*b* and the holders 14*a* to 14*d* can all be made common components before and after the swap of the arrangements of the chassis 13*a* and 13*b*, the quantity of types of components of the keyboard device 1 can be reduced.

Next, a pitch of each key 5 and solenoid 8 will be described. First, referring to FIG. 5 and FIG. 6, the definition of a pitch of the key 5 and the solenoid 8 will be described.

As shown in FIG. 5, the white key 5*a* includes a narrow width part at which the arm 52 is fixed, and a wide width part that is integrally connected to a front end of the narrow width part and has a larger dimension in the scale direction than the narrow width part. The arm 52 of each white key 5*a* is fixed to a center of the narrow width part in the scale direction. Further, the arm 52 of each black key 5*b* is similarly fixed to a center of the black key 5*b* (a part on the rear side of the pressed surface) in the scale direction.

The pitch of the key 5 is a distance measured based on the center of the arm 52 (position of the arm 52) in the scale direction. For example, among the keys 5 of the bass unit shown in FIG. 5, in the case where the white key 5*a* with a note name A0 located farthest on the bass side is taken as a reference key A0, a distance in the scale direction from the center of the arm 52 of the reference key A0 to the center of the arm 52 of the black key 5*b* of A #0 is a pitch Lp1.

Hereinafter, taking the reference key A0 of the bass unit as a base point (taking the reference key A0 as the $0^{th}$ key 5), the pitch of an $x^{th}$ key 5 arranged from the bass side will be described as Lpx. In FIG. 5, pitches Lp1 to Lp5 of the $1^{st}$ to $5^{th}$ keys arranged from the bass side are shown.

Similarly for the treble unit shown in FIG. 6, taking a reference key F4 as a base point, the pitch of an $x^{th}$ key 5 arranged from the bass side will be described as Hpx. In FIG. 6, pitches Hp1 to Hp5 of the $1^{st}$ to $5^{th}$ keys arranged from the bass side are shown.

Further, the pitch of the solenoid 8 is a distance measured based on an axis of the plunger 80 (center of the solenoid 8 in the scale direction). For example, in FIG. 5, in the case where the solenoid 8 located farthest on the bass side is taken as a reference solenoid 8A, a distance in the scale direction from the center of the plunger 80 of the reference solenoid 8A to the center of the plunger 80 of a solenoid 8 arranged next on the treble side is a pitch Sp1.

Hereinafter, taking the reference solenoid 8A as a base point (taking the reference solenoid 8A as the $0^{th}$ solenoid 8), the pitch of an $x^{th}$ solenoid 8 arranged from the bass side will be described as Spx. In FIG. 5, pitches Sp1 to Sp5 of the $1^{st}$ to $5^{th}$ solenoids 8 arranged from the bass side are shown.

Next, referring to FIG. 5 and FIG. 7A, the pitch Lpx of each key 5 of the bass unit will be described. FIG. 7A is a table showing the pitch Lpx of the key 5 of the bass unit.

As shown in FIG. 5 and FIG. 7A, the pitch Lp1 from the reference key A0 to the black key 5*b* of A #0 is 13.4 mm, and the pitch Lp2 from the reference key A0 to the white key 5*a* of B0 is 26.9 mm. Further, the pitches Lp3 to Lp5 from the reference key A0 to each of the keys 5 of C1, C #1, and D1 are respectively 41.1 mm, 55.1 mm, and 69.2 mm. The column "Pitch (mm) of key of bass unit" in FIG. 7A also shows pitches Lp6 to Lp10 from the reference key A0 for the keys 5 arranged on the treble side of the white key 5*a* of D1.

Next, referring to FIG. 6 and FIG. 7B, the pitches Hp1 to Hp10 of the keys 5 of the treble unit will be described. FIG. 7B is a table showing the pitch Hpx of the key 5 of the treble unit.

As shown in FIG. 6 and FIG. 7B, the pitch Hp1 from the reference key F4 to the black key 5*b* of F #4 is 13.5 mm, and the pitch Hp2 from the reference key F4 to the white key 5*a* of G4 is 26.9 mm. Further, the pitches Hp3 to Hp5 from the reference key F4 to each of the keys 5 of G #4, A4, and A #4 are respectively 40.3 mm, 53.7 mm, and 67.1 mm. The column "Pitch (mm) of key of treble unit" in FIG. 7B also shows the pitches Hp5 to Hp10 from the reference key F4 for the keys 5 arranged on the treble side of the black key 5*b* of A #4.

As shown in FIG. 7A and FIG. 7B, among the pitches Lp1 to Lp10 and Hp1 to Hp10 of the keys 5 of the bass unit and the treble unit, the pitches Lp2 and Hp2 match at 26.9 mm, but all the other pitches have different values between the bass unit and the treble unit. This is because in the bass unit shown in FIG. 5, the base point of the pitch Lpx is the white key 5*a* of A0, while in the treble unit shown in FIG. 6, the base point of the pitch Hpx is the white key 5*a* of F4 (key 5 with a different note name from the bass unit).

In this case, for example, if the pitch Spx of the solenoid 8 is set to the same value as the pitch Lpx of the key 5 of the bass unit, an error (shift in the scale direction) will occur in the arrangement of the solenoid 8 with respect to each key 5 of the treble unit. This is because, as described above, the chassis 13*a* and 13*b* are common components, and the pitch Spx of the solenoid 8 is also the same in the chassis 13*a* and 13*b*.

In the case where the pitch Spx of the solenoid 8 and the pitch Lpx of the key 5 of the bass unit are set to the same value, the error in the arrangement of the solenoid 8 with respect to the key 5 of the treble unit may be calculated according to "Lpx−Hpx", but a maximum error of "Lp6−Hp6 (83.3−80.6)=2.7 (mm)" occurs. This means that the solenoid 8 is arranged shifted by 2.7 mm on the treble side with respect to the 6th key 5 from the reference key F4 in the treble unit. With respect to the $11^{th}$ key 5 and onward from the reference key F4, a maximum error in the arrangement of the solenoid 8 is also 2.7 mm on the treble side. If such an error occurs in the arrangement of the solenoid 8 with respect to the key 5, it becomes difficult to appropriately transmit a driving force from the solenoid 8 (plunger 80) to the arm 52.

This problem also occurs in the case where the pitch Spx of the solenoid 8 is matched with the pitch Hpx of the key 5 of the treble unit. In that case, as the error in the arrangement of the solenoid 8 with respect to the key 5 can also be calculated according to "Hpx−Lpx", a maximum error of 2.7 mm occurs.

In contrast, in this embodiment, the pitch Spx of the solenoid 8 is set based on an average value of the pitch Lpx of the key 5 of the bass unit and the pitch Hpx of the key 5 of the treble unit. The pitch Spx of the solenoid 8 will be described with reference to FIG. 7C and FIG. 7D. FIG. 7C is a table showing an average value Avx of the pitches of the keys 5 of the bass unit and the treble unit, and FIG. 7D is a table showing the pitch Spx of the solenoid 8.

As shown in FIG. 7C, the average value Avx of the pitches of the keys 5 of the bass unit and the treble unit is calculated according to "(Lpx+Hpx)/2". For example, an average value Av1 of the pitch Lp1 (13.4 mm) from the reference key A0 of the bass unit to the black key 5*b* of A #0 and the pitch Hp1 (13.5 mm) from the reference key F4 of the treble unit to the black key 5*b* of F #4 is 13.45 mm. The average values Av1 to Av10 of the pitches of the keys 5 calculated in this manner are shown in "Average value (mm) of pitch of key" in FIG. 7C.

On the other hand, as shown in FIG. 7D, the pitch Spx of the solenoid 8 is set to a value (average value Avx±0.05 mm) almost identical to the average value Avx of the pitches of the keys 5 of the bass unit and the treble unit. The case where the solenoid 8 set to such a pitch Spx is applied to the bass unit and the treble unit will be described. First, referring to FIG. 7E, the bass unit will be described.

FIG. 7E is a table showing an error Lgx in the arrangement of the solenoid 8 with respect to the key 5 of the bass unit. The column "Spx−Lpx (mm)" in FIG. 7E shows the error Lgx in the case where the arrangement of the reference solenoid 8A is aligned with the reference key A0 of the bass unit. Further, the column "Spx−Lpx+0.7 (mm)" in FIG. 7E shows the error Lgx in the case where the arrangement of the reference solenoid 8A is offset by 0.7 mm on the treble side with respect to the reference key A0.

As shown in FIG. 7E, in the case where the arrangement of the reference solenoid 8A and the arrangement of the reference key A0 of the bass unit are aligned in the scale direction, the error Lgx in the arrangement of the solenoid 8 with respect to each key 5 can be calculated according to "Spx−Lpx".

As shown in the column "Spx−Lpx (mm)", a maximum error Lgx is "Sp6−Lp6 (81.9−83.3)=−1.4 (mm)". This means that in the case where the arrangement of the reference solenoid 8A is aligned with the reference key A0 of the bass unit, the solenoid 8 is arranged shifted by 1.4 mm on the bass side with respect to the 6th key 5 from the reference key A0. Further, a maximum error in the arrangement of the solenoid 8 with respect to the 11th key 5 and onward from the reference key A0 is also 1.4 mm on the bass side.

As described above, for example, in the case where the pitch Spx of the solenoid 8 and the pitch Hpx of the key 5 of the treble unit are set to the same value, the maximum error in the arrangement of the solenoid 8 with respect to the key 5 of the bass unit is 2.7 mm. In contrast, by setting the pitch Spx of the solenoid 8 to ±0.5 mm of the average value Avx of the pitches of the keys 5 of the bass unit and the treble unit, it is possible to keep the error in the arrangement of the solenoid 8 with respect to the key 5 of the bass unit to 1.4 mm or less. Accordingly, it is possible to appropriately transmit a driving force of the solenoid 8 to each key 5 of the bass unit.

Herein, the values of Lgx in the column "Spx−Lpx (mm)" in FIG. 7E are all zero or negative values. That is, in the case where the arrangement of the reference solenoid 8A is aligned with the reference key A0 of the bass unit, there is no error in the arrangement of the solenoid 8 with respect to each key 5 to the treble side, while the error to the bass side is large.

Thus, in this embodiment, instead of aligning the arrangement of the reference solenoid 8A with the reference key A0 of the bass unit, the arrangement of the reference solenoid 8A (attachment position of the bass-side chassis 13*a* at the shelf plate 30 shown in FIG. 2) is offset by 0.7 mm on the treble side with respect to the reference key A0. The error Lgx in the arrangement of the solenoid 8 after this offset is shown in "Spx−Lpx+0.7 (mm)" in FIG. 7E. A maximum value of Lgx becomes 0.7 mm on the positive side and a maximum value of Lgx becomes 0.7 mm on the negative side.

That is, in this embodiment, the bass-side chassis 13*a* is arranged at a position where the error in the arrangement of each solenoid 8 with respect to the key 5 of the bass unit is 0.7 mm or less with respect to each key 5 (all of the keys 5). Accordingly, it is possible to appropriately transmit a driving force of the solenoid 8 to each key 5 of the bass unit.

Next, referring to FIG. 7F, the treble unit will be described. FIG. 7F is a table showing an error Hgx in the arrangement of the solenoid 8 with respect to the key 5 of the treble unit. The column "Spx−Hpx (mm)" in FIG. 7F shows the error Hgx in the case where the arrangement of the reference solenoid 8A is aligned with the reference key F4 of the treble unit. Further, the column "Spx−Hpx−0.6 (mm)" in FIG. 7F shows the value of the error Hgx in the case where the arrangement of the reference solenoid 8A is offset by 0.6 mm on the bass side with respect to the reference key F4.

As shown in the column "Spx−Hpx (mm)" in FIG. 7F, in the case where the arrangement of the reference solenoid 8A is aligned with the reference key F4 of the treble unit, a maximum error Hgx in the arrangement of the solenoid 8 with respect to each key 5 is "Sp6−Hp6 (81.9−80.6)=1.3 (mm)". This means that in the case where the arrangement of the reference solenoid 8A is aligned with the reference key F4 of the treble unit, the solenoid 8 is arranged shifted by 1.3 mm on the treble side with respect to the 6th key 5 from the reference key F4. A maximum error in the arrangement of the solenoid 8 with respect to the $11^{th}$ key 5 and onward from the reference key F4 is also 1.3 mm on the treble side.

As described above, for example, in the case where the pitch Spx of the solenoid 8 and the pitch Lpx of the key 5 of the bass unit are set to the same value, a maximum error in the arrangement of the solenoid 8 with respect to the key 5 of the treble unit is 2.7 mm. In contrast, by setting the pitch Spx of the solenoid 8 to +0.05 mm of the average value Avx of the pitches of the keys 5 of the bass unit and the treble unit, it is possible to keep the error in the arrangement of the solenoid 8 with respect to the key 5 of the treble unit to 1.3 mm or less. Accordingly, it is possible to appropriately transmit a driving force of the solenoid 8 to each key 5 of the treble unit.

Herein, in the column "Spx−Hpx (mm)" in FIG. 7F, a maximum value Hgx is 1.3 mm on the positive side and is 0.1 mm on the negative side. That is, in the case where the arrangement of the reference solenoid 8A is aligned with the reference key F4 of the treble unit, the error in the arrangement of the solenoid 8 with respect to each key 5 is larger to the treble side and is smaller to the bass side.

Thus, in this embodiment, the arrangement of the reference solenoid 8A (attachment position of the treble-side chassis 13*b* at the shelf plate 30 shown in FIG. 2) is offset by 0.6 mm on the treble side with respect to the reference key F4. This offset amount of 0.6 mm is obtained by averaging the minimum value (−0.1) and the maximum value (1.3) of "Spx−Hpx" ("(−0.1+1.3)/2=0.6"). The column "Spx−Hpx−0.6 (mm)" in FIG. 7F shows the error Hgx in the arrangement of the solenoid 8 after the offset, and a maximum value of Hgx is 0.7 mm on the positive side and is 0.7 mm on the negative side.

That is, the treble-side chassis 13*b* is arranged at a position where the error in the arrangement of each solenoid 8 with respect to the key 5 of the treble unit also becomes 0.7 mm or less with respect to each key 5 (all of the keys 5). Accordingly, it is possible to appropriately transmit a driving force of the solenoid 8 to each key 5 of the treble unit.

As described above, by setting the pitch Spx of the solenoid 8 (to Avx+0.05 mm) based on the average value Avx of the pitches of the keys 5 of the bass unit and the treble unit, it is possible to smooth out both the error in the arrangement of the solenoid 8 with respect to the key 5 of the bass unit and the error in the arrangement of the solenoid 8 with respect to the key 5 of the treble unit. Further, since the bass-side chassis 13*a* and the treble-side chassis 13*b* are identical components, even in the case where the arrangements of the chassis 13*a* and 13*b* are swapped with each other, it is similarly possible to smooth out the error in the solenoid 8 with respect to the key 5 of each unit. Thus, it is possible to appropriately transmit a driving force of the solenoid 8 to each key 5 of the bass unit and the treble unit while reducing the quantity of types of components of the keyboard device 1.

In this embodiment, although the pitch Spx of the solenoid 8 is set to +0.05 mm of the average value Avx of the pitches of the keys 5 of the bass unit and the treble unit, the embodiment is not necessarily limited thereto. For example, if the pitch Spx of the solenoid 8 is within the range of +0.1 mm of the average value Avx, it is possible to appropriately transmit a driving force of the solenoid 8 to each key 5 of the bass unit and the treble unit.

Further, in this embodiment, the solenoid 8 is offset by 0.7 mm on the treble side with respect to the key 5 of the bass unit, and is offset by 0.6 mm on the bass side with respect to the key 5 of the treble unit. However, the amount of this offset may also be zero, or may also be a value smaller or larger than 0.7 (0.6) mm. Nonetheless, in an exemplary embodiment, a maximum error in the arrangement of the solenoid 8 with respect to each key 5 is 1 mm or less. Accordingly, it is possible to appropriately transmit a driving force of the solenoid 8 to each key 5.

Further, in this embodiment, the keys 5 are divided into two regions including the bass unit and the treble unit, and each solenoid 8 is supported by the bass-side chassis 13*a* and the treble-side chassis 13*b*, but the embodiment is not necessarily limited thereto. For example, each key 5 may be divided into four units and each solenoid 8 may be supported by four common solenoid chassis 13, or each key 5 may be divided into three or five or more units. In the case of any of these configurations, the pitch of the solenoid 8 may also be set based on the average value of the pitches of the keys 5 of each unit.

Figure 8:
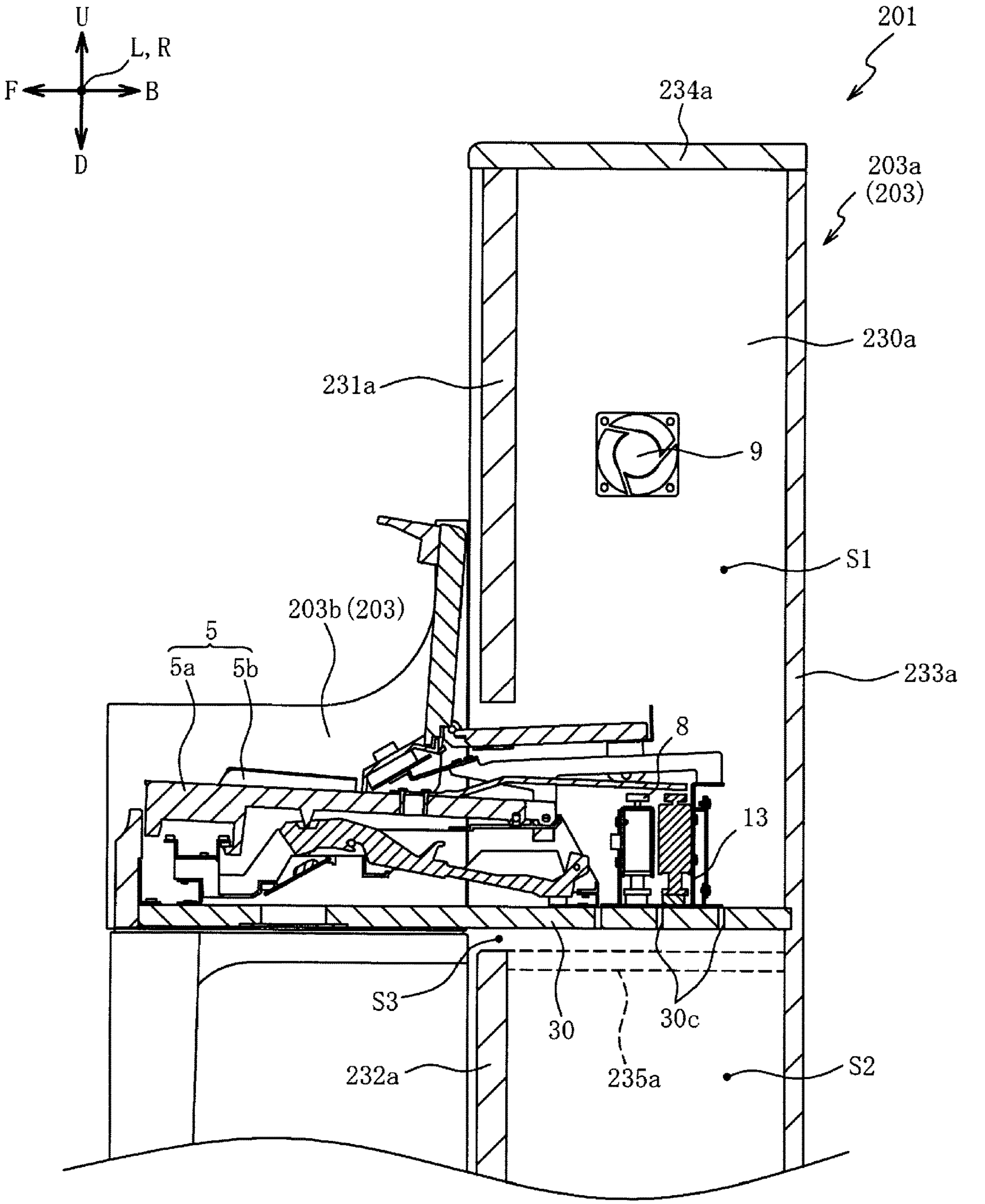
FIG. 8 is a partially enlarged cross-sectional view of a keyboard device according to a second embodiment.

Next, referring to FIG. 8, a keyboard device 201 according to a second embodiment will be described. While the case where the keyboard device 1 is an electronic musical instrument that is modeled after a grand piano has been described in the first embodiment, in the second embodiment, the case where the keyboard device 201 is an electronic musical instrument that is modeled after an upright piano will be described. Parts identical to those in the first embodiment will be labeled with the same reference signs, and descriptions thereof will be omitted. FIG. 8 is a partially enlarged cross-sectional view of the keyboard device 201 according to the second embodiment.

As shown in FIG. 8, a housing 203 of the keyboard device 201 includes a main body part 203*a* in a substantially cuboid shape and a keyboard table 203*b* that protrudes from (toward arrow F side) a front surface of the main body part 203*a* and supports a plurality of keys 5.

The main body part 203*a* includes a pair of lateral plates 230*a* that are spaced apart at a predetermined interval in the scale direction (arrow L-R direction), an upper front plate 231*a* and a lower front plate 232*a* that connect front ends (ends on arrow F side) of the pair of lateral plates 230*a* in the scale direction, a rear plate 233*a* that connects rear ends (ends on arrow B side) of the pair of lateral plates 230*a* in the scale direction on the rear side of the upper front plate 231*a* and the lower front plate 232*a*, and a top plate 234*a* that is connected to an upper end of the rear plate 233*a* to close off a space (hereinafter referred to as an "accommodating space S1") inside the main body part 203*a*.

A shelf plate 30 that forms a bottom surface of the keyboard table 203*b* extends to the rear plate 233*a* of the main body part 203*a*. Various components such as solenoids 8 and a solenoid chassis 13 similar to those in the first embodiment are supported on the shelf plate 30.

A fan 9 is fixed to the lateral plate 230*a* of the main body part 203*a*, and an air intake port 30*c* penetrating the shelf plate 30 in the up-down direction is formed at the shelf plate 30 supporting the solenoid 8. Thus, by driving the fan 9, relatively cold air below the shelf plate 30 is sucked into the accommodating space S1. Since the air intake port 30*c* is formed in the vicinity of the solenoid 8, the solenoid 8 can be efficiently cooled down by the relatively cold air sucked from the air intake port 30*c*.

Further, since the fan 9 is arranged higher than the air intake port 30*c*, the air in the accommodating space S1 warmed by the solenoid 8 is efficiently exhausted through the fan 9 by an airflow generated by the fan 9 as well as a rising airflow due to natural convection. Thus, since accumulation of hot air in the accommodating space S1 can be suppressed, the solenoid 8 can be cooled down efficiently.

Since an upright-type keyboard device 201 is often installed with the rear plate 233*a* arranged against a wall, for example, if the fan 9 is attached to the rear plate 233*a*, heat would easily accumulate between the keyboard device 201 and the wall. In contrast, by attaching the fan 9 to the lateral plate 230*a* as in this embodiment, the heat inside the housing 203 can be efficiently dissipated.

In the keyboard device 201, various devices such as speakers may be arranged in a space S2 between the lower front plate 232*a* and the rear plate 233*a*, and in such a case, air warmed by the various devices may be supplied to the solenoid 8 side through the air intake port 30*c*. Thus, in the case where the solenoid 8 cannot be sufficiently cooled down with the air of the space S2, configurations as in the following examples may be adopted.

For example, as a first example, a gap S3 is formed between an upper end of the lower front plate 232*a* and the shelf plate 30, and an upper part of the space S2 is closed off by a shielding plate 235*a* (a plate connecting the lower front plate 232*a* and the rear plate 233*a*) as shown in a broken line in FIG. 8. With this configuration, relatively cold air below the keyboard table 203*b* can be supplied to the solenoid 8 side through the gap S3 and the air intake port 30*c*.

Further, as a second example, with the gap S3 omitted (or with the gap S3 added), a ventilation port penetrating the lower front plate 232*a* is formed, and a shielding plate 235*a* is arranged lower than the ventilation port (higher than the various devices in the space S2). With this configuration as well, relatively cold air below the keyboard table 203*b* can be supplied to the solenoid 8 side through the ventilation port of the lower front plate 232*a* and the air intake port 30*c* of the shelf plate 30.

Figure 9:
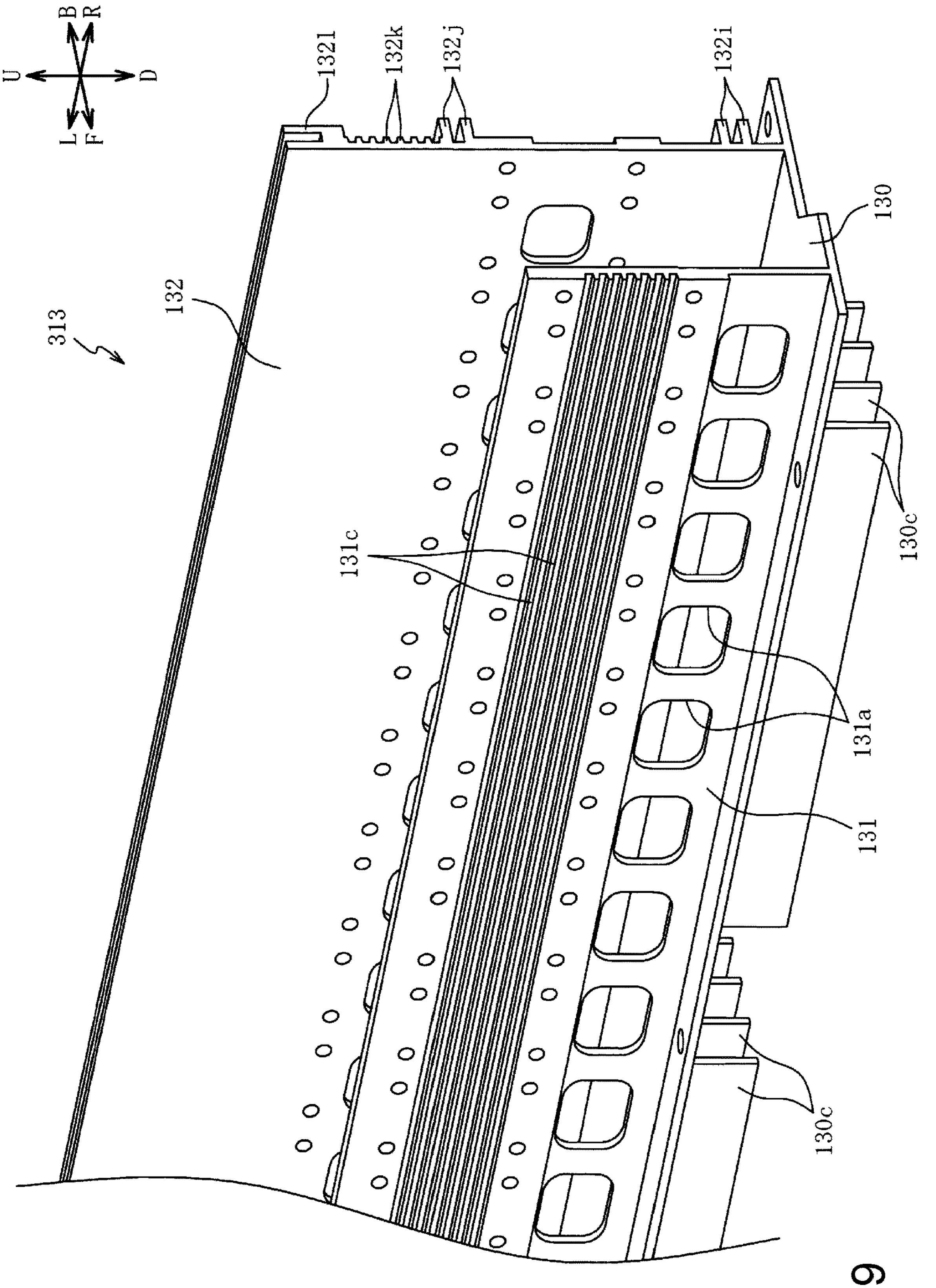
FIG. 9 is a front perspective view of a chassis according to a first modification example.
Figure 10:
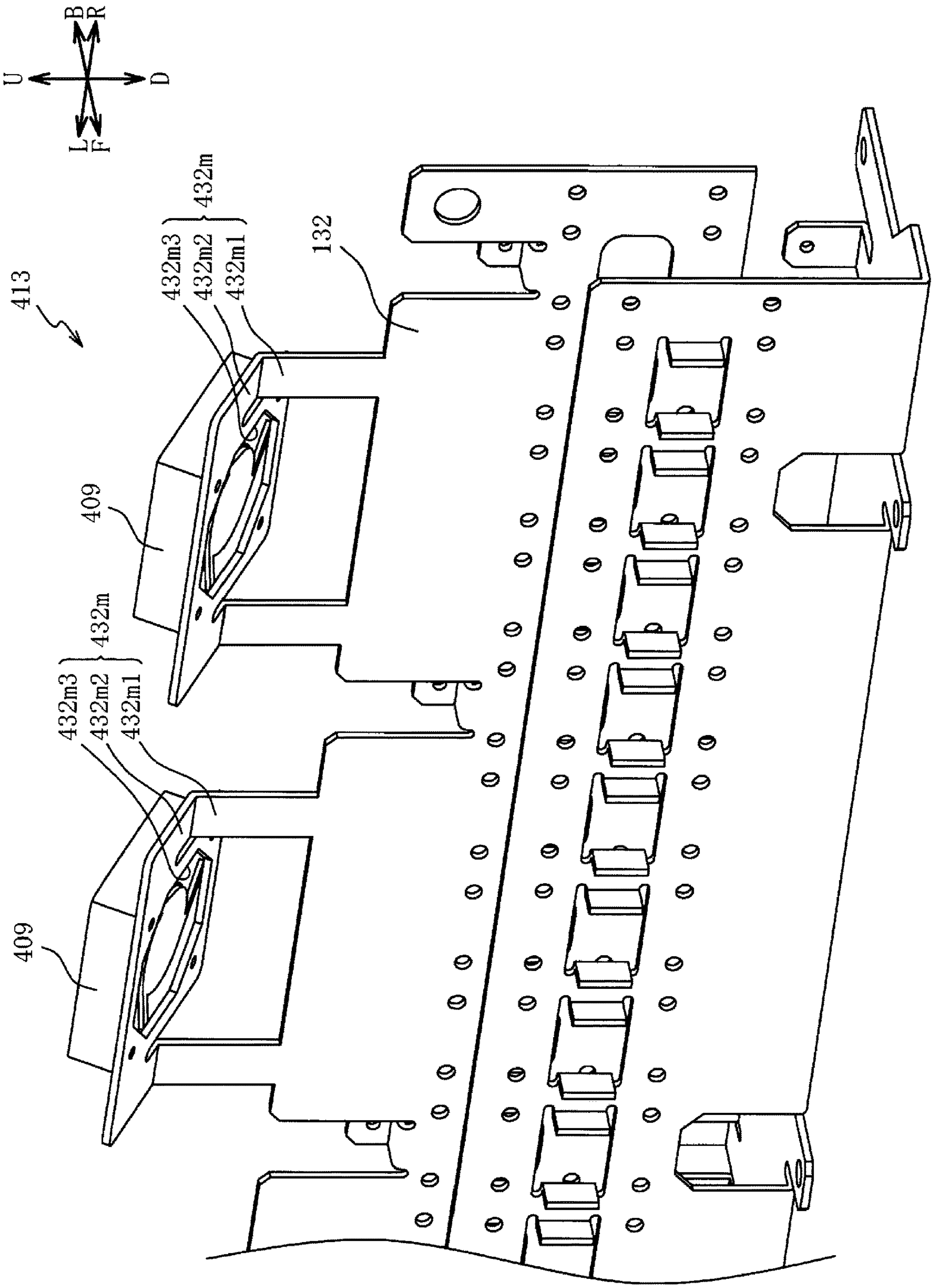
FIG. 10 is a front perspective view of a chassis according to a second modification example.

Next, referring to FIG. 9 and FIG. 10, modification examples of chassis 313 and 413 will be described. Parts identical to those in the above embodiments will be labeled with the same reference signs, and descriptions thereof will be omitted. FIG. 9 is a front perspective view of a chassis 313 according to a first modification example, and FIG. 10 is a front perspective view of a chassis 413 according to a second modification example. In FIG. 9 and FIG. 10, illustration of the solenoid 8 (see FIG. 3A and FIG. 3B) supported by the chassis 313 and 413 is omitted.

As shown in FIG. 9, a heat dissipation plate 130*c* in a plate shape protrudes downward from the bottom surface part 130 of the chassis 313 of the first modification example. A plurality (four in this embodiment) of heat dissipation plates 130*c* extending in the scale direction (arrow L-R direction) are arranged side by side in the front-rear direction (arrow F-B direction), and if the plurality of heat dissipation plates 130*c* are taken as one set, a plurality of sets of heat dissipation plates 130*c* are arranged side by side in the scale direction. Since the heat dissipation plates 130*c* function as heat sinks, it becomes easy to dissipate the heat of the bottom surface part 130. Thus, the solenoid 8 (not shown) supported by the chassis 313 can be cooled down efficiently.

In this modification example of the chassis 313, the opening 130*b* (see FIG. 3B) of the bottom surface part 130 is omitted, but it is of course possible to form the opening 130*b* in addition to the heat dissipation plate 130*c*.

A plurality of openings 131*a* arranged side by side in the scale direction are formed at a lower end side of the front surface part 131. Since the openings 131*a* are formed at positions facing the solenoids 8 (not shown) in the front-rear direction (arrow F-B direction), the solenoids 8 can be cooled down efficiently.

A protrusion 131*c* (groove) extending in the scale direction is formed on the upper side of the openings 131*a*. The protrusion 131*c* protrudes forward from the front surface of the front surface part 131, and a plurality (six in this embodiment) of protrusions 131*c* are arranged side by side in the up-down direction. Since the protrusions 131*c* also function as heat sinks, it becomes easy to dissipate the heat of the front surface part 131.

Heat dissipation plates 132*i* and 132*j* in plate shapes protrude to the rear side from the rear surface of the rear surface part 132. The heat dissipation plates 132*i* and 132*j* are each composed of two plates that extend in the scale direction (facing each other in the up-down direction), with the heat dissipation plate 132*i* being formed on the lower side of an up-down center of the rear surface part 132, and the heat dissipation plate 132*j* being formed on the upper side of the up-down center of the rear surface part 132.

A protrusion 132*k* (groove) extending in the scale direction is formed on the upper side of the heat dissipation plate 132*j*. The protrusion 132*k* is a protrusion that protrudes rearward from the rear surface of the rear surface part 132, and a plurality (six in this embodiment) of protrusions 132*k* are arranged side by side in the up-down direction.

A heat dissipation plate 132*l* is formed on the upper side of the protrusion 132*k*. The heat dissipation plate 132*l* is formed in an L-shape that protrudes rearward from the rear surface of the rear surface part 132 and bends upward.

Since the heat dissipation plates 132*i*, 132*j*, and 132*l* and the protrusion 132*k* function as heat sinks, it becomes easy to dissipate the heat of the rear surface part 132. Thus, the solenoid 8 (not shown) supported by the chassis 313 can be cooled down efficiently.

As shown in FIG. 10, the chassis 413 of the second modification example includes a support part 432*m* at an upper part of the rear surface part 132 to support a fan 409. The support part 432*m* is formed at a plurality of positions (e.g., eight positions) of the rear surface part 132 in the scale direction (arrow L-R direction). The support part 432*m* includes a pair of leg parts 432*m*1 that are spaced apart at a predetermined interval in the scale direction, and an attached part 432*m*2 at which the fan 409 is attached at upper parts of the pair of leg parts 432*m*1. These parts 432*m*1 and 432*m*2 are integrally formed with the rear surface part 132.

The leg part 432*m*1 extends upward from an upper end of the rear surface part 132, and the attached part 432*m*2 is inclined upward to the front side (arrow F side) from upper ends of the leg parts 432*m*1. The fan 409 is screwed to an upper surface (rear surface) of the attached part 432*m*2 in a plate shape, and a through hole 432*m*3 facing the fan 409 is formed at a center of the attached part 432*m*2.

The fan 409 is a blower that generates an airflow directed downward (solenoid 8 (not shown) side) through the through hole 432*m*3. By providing such a fan 409 at the chassis 413, the solenoid 8 (not shown) supported by the chassis 413 can be cooled down efficiently.

The orientation of the fan 409 may also be changed to generate an airflow directed toward the fan 9 side (see FIG. 2) through the through hole 432*m*3. With such a configuration, the air warmed by the solenoid 8 can be efficiently exhausted from the fan 9.

Although descriptions have been made based on the above embodiments, it should be easily inferred that the disclosure is not limited to these embodiments and various modifications may be made without departing from the spirit of the disclosure.

In each of the above embodiments, it has been described that the keyboard device 1 and 201 is an electronic musical instrument modeled after an acoustic grand piano or an upright piano, but the embodiment is not necessarily limited thereto. For example, the keyboard device 1 and 201 may also be an acoustic grand piano or an upright piano, or may also be an electronic organ.

In each of the above embodiments, it has been described that air is sucked from the air intake port 30*c* formed at the shelf plate 30, but the embodiment is not necessarily limited thereto. For example, an air intake port may be formed at the lid 30*b*, and in that case, the air intake port 30*c* may be omitted.

In each of the above embodiments, the solenoid 8 has been illustrated as an example of a drive device that applies a driving force to the key 5, but the embodiment is not necessarily limited thereto. For example, another known drive device such as an actuator may also be adopted as the means for applying a driving force to the key 5.

In each of the above embodiments, it has been described that the driving force of the solenoids 8 arranged side by side in a staggered pattern is applied to the key 5 via the arm 52, but the embodiment is not necessarily limited thereto. For example, the driving force of the solenoid 8 may also be directly applied to the key 5, or may also be indirectly applied to the key 5 via another member such as the hammer 6. Further, the solenoids 8 may also be arranged side by side in one row along the scale direction.

In each of the above embodiments, it has been described that a plurality of openings 130*b* and 131*a* are formed at the bottom surface part 130 and the front surface part 131 of the solenoid chassis 13, but the openings 130*b* and 131*a* may also be omitted, or other openings may also be formed in addition to the openings 130*b* and 131*a*. Further, the openings 130*b* and 131*a* may also be elongated holes extending in the scale direction.

In each of the above embodiments, it has been described that the opening 131*a* of the front surface part 131 is formed at a position facing the solenoid 8, but the opening 131*a* may also be formed at a position that does not face the solenoid 8 (e.g., higher than the solenoid 8). Even in the case where the opening 131*a* does not face the solenoid 8, since it becomes easy to dissipate the heat of the front surface part 131 by the air passing through the opening 131*a*, the solenoid 8 can be cooled down efficiently.

In each of the above embodiments, it has been described that the heat dissipation plate 131*b* of the solenoid chassis 13 has a plate shape extending in the up-down direction (the heat dissipation plates 131*b* face each other in the scale direction), but the embodiment is not necessarily limited thereto. For example, the heat dissipation plate 131*b* may also be formed in a plate shape extending in the scale direction (the plurality of heat dissipation plates 131*b* face each other in the up-down direction), or the heat dissipation plate 131*b* may also be omitted.

In each of the above embodiments, it has been described that the solenoid chassis 13 supporting the solenoids 8 is composed of the bass-side chassis 13*a* and the treble-side chassis 13*b*, but the embodiment is not necessarily limited thereto. For example, the plurality of solenoids 8 may also be supported by one solenoid chassis 13. Further, it has been described that the solenoid 8 is fixed to the front surface part 131 and the rear surface part 132 of the solenoid chassis 13, but the solenoid 8 may also be supported by the bottom surface part 130 with the surface parts 131 and 132 omitted.

Further, as described above, in the case where the solenoids 8 are arranged in one row along the scale direction, the solenoid 8 may also be fixed to the rear surface part 132 (front surface part 131) with the front surface part 131 (rear surface part 132) omitted. Further, the solenoid 8 may also be directly fixed to the housing 3 with the solenoid chassis 13 omitted.

In each of the above embodiments, it has been described that the bass-side chassis 13*a* and the treble-side chassis 13*b* are common components, but the embodiment is not necessarily limited thereto. For example, the bass-side chassis 13*a* and the treble-side chassis 13*b* may also be different components, and in that case, it is of course possible to configure the arrangements of the chassis 13*a* and 13*b* to be capable of being swapped with each other.

In each of the above embodiments, it has been described that the pitch of the solenoid 8 supported by the bass-side chassis 13*a* and the pitch of the solenoid 8 supported by the treble-side chassis 13*b* are the same, but these pitches may also be different (i.e., the solenoids 8 arranged at pitches matching the keys 5 of the bass unit are supported by the bass-side chassis 13*a*, and the solenoids 8 arranged at pitches matching the keys 5 of the treble unit are supported by the treble-side chassis 13*b*).

In each of the above embodiments, it has been described that the pitch of the solenoid 8 is set based on the average value of the pitch of the key 5 of the bass unit and the pitch of the key 5 of the treble unit, but the embodiment is not necessarily limited thereto. For example, the pitch of the key 5 of the bass unit (the key 5 of the treble unit) and the pitch of solenoid 8 may be matched.

In each of the above embodiments, it has been described that the holder 14 is fixed to the solenoid chassis 13 (bent part 132*a*), but the embodiment is not necessarily limited thereto. For example, a rear end portion of the holder 14 may be extended more rearward than the solenoid chassis 13, and a leg part extending downward from this extended portion may be fixed to the shelf plate 30. Further, the holder 14 may be fixed only to the chassis 4, or in the case where there is no need to support the operation panel 18 (substrate 16), the holder 14 may be omitted.

In each of the above embodiments, it has been described that the plurality of holders 14*a* to 14*d* are common components, and it is not required to change the arrangements of the holders 14*a* to 14*d* before and after swapping the arrangements of the chassis 13*a* and 13*b* on the bass side and the treble side, but the embodiment is not necessarily limited thereto. For example, the plurality of holders 14*a* to 14*d* may also be configured as separate parts, and the arrangements (fixed positions with respect to the fixing bracket 15 and the substrate 16) of the holders 14*a* to 14*d* may also be changed according to the swap of the arrangements of the chassis 13*a* and 13*b*.

Further, it has been described that the plurality of screw holes 132*b* to 132*h* are formed as an example of the means for fixing the common holders 14*a* to 14*d* to each chassis 13*a* and 13*b* before and after the swap of the arrangements of the chassis 13*a* and 13*b*, but the embodiment is not necessarily limited thereto. For example, the screw holes 132*b* to 132*h* may be a plurality of through holes (or elongated holes extending in the scale direction), and the holders 14*a* to 14*d* may be fixed to these through holes (elongated holes) with bolts and nuts.

In each of the above embodiments, it has been described that the gap between the operation panel 18 and the keyboard cover 19 is blocked by the panel-side protrusion 183, the elastic body 184, and the cover-side protrusion 190, but the embodiment is not necessarily limited thereto. For example, the protrusions 183 and 190 and the elastic body 184 (blocking part) may also be omitted. Further, in the case where the keyboard cover 19 is configured to slide with respect to the housing 3 and 203, the gap between the keyboard cover 19 in the opened state and the housing 3 and 203 may be blocked by an elastic body or the like.

In each of the above embodiments, it has been described that the panel-side protrusion 183 and the elastic body 184 are continuously formed across two ends in the scale direction of the operation panel 18, and the cover-side protrusion 190 is continuously formed across two ends in the scale direction of the keyboard cover 19, but the embodiment is not necessarily limited thereto. The protrusions 183 and 190 and the elastic body 184 may also be discontinuous in the scale direction.

In the first embodiment, it has been described that the fan 9 is attached to the rear plate part 35*b*, but the embodiment is not necessarily limited thereto. For example, the fan 9 may be attached to the lateral plate 31 (protruding part 31*a*), the top plate 32, the front plate 33, the rear plate 34, the top plate part 35*a* of the blocking plate 35, the back surface plate 36, the soundboard 38, or the lower plate 39. In the case where the fan 9 is attached to a plate located more rearward than the rear plate 34, an airflow directed from the air intake port 30*c* to the fan 9 may be generated by forming a ventilation port at the rear plate 34 or omitting the rear plate 34.

That is, as long as the fan 9 is attached to the housing 3 at least on the upper side of the shelf plate 30 (air intake port 30*c*), its attachment position may be set appropriately. Thus, the fan 9 is not necessarily attached to the wall of the housing 3, and for example, the fan 9 may be supported inside the accommodating space S1 and an exhaust port may be provided at the wall of the housing 3 to generate an airflow toward the exhaust port side by the fan 9 (in the case of such a configuration, an exhaust path connecting the fan 9 and the exhaust port may be provided). The same applies to the keyboard device 201 of the second embodiment.

In the first embodiment, it has been described that the fan 9 is attached on the treble side of the center in the scale direction of the rear plate part 35*b*, but the embodiment is not necessarily limited thereto. For example, the fan 9 may also be attached to the center in the scale direction of the rear plate part 35*b*, or may also be attached to the bass side of the center in the scale direction of the rear plate part 35*b*.

What is claimed is:

1. A keyboard device comprising:
   - a plurality of keys arranged side by side in a scale direction;
   - a plurality of drive devices that apply, to the plurality of keys, a driving force swinging the key;
   - a housing that comprises a shelf plate supporting the plurality of drive devices; and
   - a fan that is attached to an upper side of the shelf plate of the housing and exhausts air in the housing to outside, wherein
   - the shelf plate comprises an air intake port for sucking in air outside the housing by the fan.

2. The keyboard device according to claim 1, wherein the fan exhausts air toward a rear side of the housing.

3. The keyboard device according to claim 2, wherein the housing comprises:
   - a large roof pivotally supported at an end of the housing on a bass side in the scale direction;
   - a soundboard arranged below the large roof; and
   - an attachment plate that rises upward from a front end side of the soundboard and to which the fan is attached, wherein
   - the fan is attached to a treble side of a center of the attachment plate in the scale direction.

4. The keyboard device according to claim 3, further comprising:
   - a speaker that is provided inside the housing and emits sound toward a soundboard side, wherein
   - the housing comprises a rear plate extending upward from a rear end side of the shelf plate to the attachment plate, and
   - the speaker is arranged in a space in the housing formed on a rear side of the rear plate.

5. The keyboard device according to claim 1, wherein the housing comprises:
   - a panel that covers an upper surface of a rear end side of the plurality of keys; and
   - a keyboard cover that rotates on an upper side of the panel, wherein
   - at least one of the panel and the keyboard cover comprises a blocking part that blocks a gap between the panel and the keyboard cover in an opened state of the keyboard cover.

6. The keyboard device according to claim 5, wherein the blocking part is a protrusion that is formed on an upper surface of the panel and extends in the scale direction, and
   - the protrusion faces a rear surface of a lower end side of the keyboard cover in the opened state of the keyboard cover.

7. The keyboard device according to claim 6, wherein at least one of the panel and the keyboard cover comprises an elastic body that is sandwiched between the rear surface of the lower end side of the keyboard cover and the protrusion in the opened state.

8. The keyboard device according to claim 1, further comprising: a support member made of metal that supports the plurality of drive devices and is attached to the shelf plate, wherein the support member is formed in a plate shape rising from the shelf plate and comprises a fixed part at which the plurality of drive devices are fixed on a front surface or a rear surface of the fixed part, and the fixed part comprises an opening for heat dissipation.

9. The keyboard device according to claim 8, wherein the opening is formed at a position facing the drive device.

10. The keyboard device according to claim 8, wherein a gap is formed between the drive devices adjacent to each other in the scale direction, and the opening is formed at a position facing the gap.

11. The keyboard device according to claim 8, wherein the fixed part comprises a plurality of protruding parts for heat dissipation that protrude from an edge of the opening.

12. The keyboard device according to claim 11, wherein the plurality of protruding parts in a plate shape extending in an up-down direction are arranged side by side in the scale direction, and the air intake port is formed below the protruding part.

13. The keyboard device according to claim 1, further comprising: a plurality of support members that support the plurality of drive devices and are arranged side by side in the scale direction, wherein the plurality of support members are configured to be capable of swapping arrangements of each other to attach to the shelf plate.

14. The keyboard device according to claim 13, wherein among the plurality of support members, a pitch of the drive device supported by one support member and a pitch of the drive device supported by another support member are set to be identical, and the pitch of the drive device is set based on an average value of a pitch of the keys to which a driving force is applied from the drive device supported by the one support member, and a pitch of the keys to which a driving force of the drive device supported by the another support member is applied.

15. The keyboard device according to claim 14, wherein the pitch of the drive device is ±0.1 mm of the average value.

16. The keyboard device according to claim 15, wherein the support member is arranged at a position where an error in an arrangement of the drive device with respect to the key in the scale direction becomes 1 mm or less with respect to the plurality of keys.

17. The keyboard device according to claim 1, further comprising:

a support member that supports the plurality of drive devices and is attached to the shelf plate on a rear side of the key;

a holder that is attached to the support member and extends forward from the support member toward an upper surface side of the key; and a panel that is attached to a front end side of the holder and covers an upper surface of a rear end side of the plurality of keys.

18. The keyboard device according to claim 17, wherein the support member is provided as a plurality of support members that have a same configuration and are arranged side by side in the scale direction, the plurality of support members are configured to be capable of swapping arrangements of each other to attach to the shelf plate, and the holder is capable of being attached to the support member without changing an arrangement of the holder before and after swapping the arrangements of the support member.

19. The keyboard device according to claim 1, wherein the drive device is a solenoid.

20. A cooling method of a drive device, which is a cooling method of a drive device in a keyboard device comprising:

a plurality of keys arranged side by side in a scale direction;

a plurality of drive devices that apply, to the plurality of keys, a driving force swinging the key;

a housing that comprises a shelf plate supporting the plurality of drive devices; and a fan that is attached to an upper side of the shelf plate of the housing and exhausts air in the housing to outside, the cooling method comprising:

forming, at the shelf plate, an air intake port for sucking in air outside the housing, and cooling down the drive device with the air sucked from the air intake port by the fan.

* * * * *